US009578115B2

(12) United States Patent
Edge et al.

(10) Patent No.: US 9,578,115 B2
(45) Date of Patent: Feb. 21, 2017

(54) INDOOR LOCATION SERVER PROVISION AND DISCOVERY

(71) Applicant: QUALCOMM Incorporated, San Diego, CA (US)

(72) Inventors: Stephen William Edge, Escondido, CA (US); Andreas Klaus Wachter, Menlo Park, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 13/840,522

(22) Filed: Mar. 15, 2013

(65) Prior Publication Data

US 2013/0339478 A1 Dec. 19, 2013

Related U.S. Application Data

(60) Provisional application No. 61/689,926, filed on Jun. 15, 2012.

(51) Int. Cl.
*H04W 24/00* (2009.01)
*H04L 29/08* (2006.01)
(Continued)

(52) U.S. Cl.
CPC ............... *H04L 67/16* (2013.01); *H04W 4/02* (2013.01); *H04W 4/20* (2013.01); *H04W 64/00* (2013.01)

(58) Field of Classification Search
CPC .................................. H04W 4/02; H04W 4/20
(Continued)

(56) References Cited

U.S. PATENT DOCUMENTS 6,785,542 B1 8/2004 Blight et al.
7,454,192 B1 11/2008 Zhu
(Continued)

FOREIGN PATENT DOCUMENTS

EP 1111951 A2 6/2001
EP 2424317 A1 2/2012
(Continued)

OTHER PUBLICATIONS

"3rd Generation Partnership Project; Technical Specification Group GSM/EDGE Radio Access Network; Functional stage 2 description of Location Services (LCS) in Geran (Release 10)", 3GPP Standard; 3GPP TS 43.059, 3rd Generation Partnership Project (3GPP), Mobile Competence Centre ; 650, Route Des Lucioles ; F-06921 Sophia-Antipolis Cedex; France, No. V10.0.0, Apr. 1, 2011 (Apr. 1, 2011), pp. 1-69, XP050476661, [retrieved on Apr. 1, 2011], paragraph [0004] - paragraph [0005] paragraph [0007], paragraph [09.1] - paragraph [09.2].

(Continued)

*Primary Examiner* — Kiet Doan
(74) *Attorney, Agent, or Firm* — Kilpatrick Townsend & Stockton, LLP

(57) ABSTRACT

Systems and methods are presented for discovering a local location server associated with a local provider based on a relationship between the local provider and another regional/global provider. A mobile device discovers the local provider and queries a home location server which returns the address of a regional/global location server associated with the regional/global provider. A mobile device then queries the regional/global location server to discover the local location server and may then access the local location server to obtain location services. The method may be employed with the OMA SUPL location solution wherein the home (Continued)

location server may be an H-SLP and the local and regional/global location servers may be D-SLPs.

29 Claims, 11 Drawing Sheets

(51) Int. Cl.
*H04W 4/02* (2009.01)
*H04W 4/20* (2009.01)
*H04W 64/00* (2009.01)

(58) Field of Classification Search
USPC .............. 455/456.3, 436, 456.1, 456.2, 404.1, 455/432.1, 411, 555; 705/43, 44; 370/338, 343, 370/401
See application file for complete search history.

(56) References Cited

U.S. PATENT DOCUMENTS

| | | |
|---|---|---|
| 8,019,347 B2 | 9/2011 | Razdan et al. |
| 8,200,247 B1 | 6/2012 | Starenky et al. |
| 8,229,389 B2 | 7/2012 | Bharatia et al. |
| 8,320,931 B2 | 11/2012 | Ward et al. |
| 8,463,295 B1 | 6/2013 | Caralis et al. |
| 8,489,669 B2 | 7/2013 | Johnson |
| 8,493,206 B2 | 7/2013 | Richey et al. |
| 8,498,807 B2 | 7/2013 | Moore et al. |
| 8,700,063 B2 | 4/2014 | Jagetiya et al. |
| 2003/0060214 A1 | 3/2003 | Hendrey et al. |
| 2004/0015537 A1 | 1/2004 | Doerksen et al. |
| 2004/0100937 A1 | 5/2004 | Chen |
| 2004/0137918 A1 | 7/2004 | Varonen et al. |
| 2004/0198397 A1 | 10/2004 | Weiss |
| 2004/0254724 A1 | 12/2004 | Mattila |
| 2005/0043037 A1 | 2/2005 | Ioppe et al. |
| 2005/0136942 A1 | 6/2005 | Timiri et al. |
| 2006/0014531 A1 | 1/2006 | Nam et al. |
| 2006/0099960 A1 | 5/2006 | Duan |
| 2006/0120320 A1 | 6/2006 | Shim |
| 2007/0032247 A1 | 2/2007 | Shaffer et al. |
| 2007/0168524 A1 | 7/2007 | Chao et al. |
| 2007/0229546 A1 | 10/2007 | Klassen et al. |
| 2009/0036116 A1 | 2/2009 | Kim et al. |
| 2009/0088180 A1 | 4/2009 | LaMance et al. |
| 2009/0319306 A1 | 12/2009 | Chanick |
| 2010/0039315 A1 | 2/2010 | Malkos et al. |
| 2010/0093380 A1 | 4/2010 | Gustafsson |
| 2010/0167760 A1 | 7/2010 | Kim |
| 2010/0240398 A1 | 9/2010 | Hotes et al. |
| 2010/0241496 A1 | 9/2010 | Gupta et al. |
| 2011/0018349 A1* | 1/2011 | Rockenfeller ........ F25B 49/022 307/66 |
| 2011/0021212 A1 | 1/2011 | Chen et al. |
| 2011/0077021 A1 | 3/2011 | Mizikovsky et al. |
| 2011/0086646 A1 | 4/2011 | Gupta et al. |
| 2011/0098059 A1 | 4/2011 | Qiu et al. |
| 2011/0105092 A1 | 5/2011 | Felt et al. |
| 2011/0142016 A1 | 6/2011 | Chatterjee |
| 2011/0201347 A1 | 8/2011 | Abraham et al. |
| 2011/0201349 A1 | 8/2011 | Castillo et al. |
| 2011/0294506 A1 | 12/2011 | Claussen et al. |
| 2011/0296184 A1* | 12/2011 | Tran ................ H04L 9/088 713/170 |
| 2012/0100874 A1 | 4/2012 | You et al. |
| 2012/0122487 A1 | 5/2012 | Holm et al. |
| 2012/0130794 A1 | 5/2012 | Strieder |
| 2012/0139781 A1 | 6/2012 | Jeong et al. |
| 2012/0158297 A1 | 6/2012 | Kim et al. |
| 2012/0170560 A1 | 7/2012 | Han et al. |
| 2012/0200411 A1 | 8/2012 | Best |
| 2012/0322462 A1 | 12/2012 | Moeller |
| 2013/0023284 A1 | 1/2013 | Stanger |
| 2013/0045751 A1 | 2/2013 | Chao et al. |
| 2013/0059608 A1 | 3/2013 | Cuff et al. |
| 2014/0162693 A1 | 6/2014 | Wachter et al. |
| 2014/0274135 A1 | 9/2014 | Edge et al. |
| 2014/0274136 A1 | 9/2014 | Edge et al. |

FOREIGN PATENT DOCUMENTS

| | | |
|---|---|---|
| GB | 2474865 A | 5/2011 |
| WO | WO-03009605 A2 | 1/2003 |
| WO | WO-2006104352 A1 | 10/2006 |
| WO | 2009022857 A2 | 2/2009 |
| WO | WO-2009036497 A1 | 3/2009 |
| WO | WO-2009067447 A1 | 5/2009 |
| WO | WO-2012114304 A1 | 8/2012 |

OTHER PUBLICATIONS

Co-pending U.S. Appl. No. 13/917,616, filed Jun. 13, 2013.
International Search Report and Written Opinion—PCT/US2013/044931—ISA/EPO—Feb. 10, 2014.
Qualcomm, Loc WG: "Supl V3.0; OMA-TP-2010-0521-Supl_V3.0_Ad_Presentation", OMA-TP-2010-0521-Supl_V3.0_Ad_Presentation, Open Mobile Alliance (OMA), Dec. 2010 (Dec. 6, 2010), 15 Pages.
Open Mobile Alliance, "User Plane Location Protocol", OMA-TS-ULP-V3_0-20110630-D, Jun. 30, 2011 (Jun. 30, 2011), pp. 1-266.

* cited by examiner

INDOOR LOCATION SERVER PROVISION AND DISCOVERY

PRIORITY

The present application claims priority to provisional US. Patent Application No. 61/689,926, filed Jun. 15, 2012, entitled "Optimized Indoor Location Server Provision and Discovery", the entire contents of which is herein incorporated by reference for all purposes

BACKGROUND

Aspects of the disclosure relate to networked computing technologies and location services. In particular, aspects of the disclosure relate to systems, methods, apparatus, and computer readable media for providing network based and network assisted positioning services to a mobile electronic device.

The Secure User Plane Location (SUPL) solution is a user plane location solution defined by the Open Mobile Alliance (OMA) that uses internet protocol technology to support location based services related to mobile devices. One focus of the SUPL solution is providing assistance data (AD) to a mobile device whose location is needed (e.g. by an application on the mobile device or by the user of the mobile device) to assist the mobile device to make suitable location related measurements and, in some cases, to compute its location using such measurements. While there are a variety of ways to provide location assistance data to a mobile device, SUPL provides a standardized environment with a simple client server model together with standardized protocols defining interaction between a SUPL location server, known as a SUPL Location Platform (SLP) and a mobile device, known as a SUPL Enabled Terminal (SET). The SUPL solution also supports the conveyance of a location estimate from a SET to an SLP, the conveyance of location related measurements from a SET to an SLP when the SLP rather than SET will compute the SET's location and the exchange of positioning and SUPL capabilities between a SET and an SLP. SUPL can, in addition, support various service related features that enhance simple positioning such as obtaining SET location estimates on a triggered or periodic basis and obtaining historic SET locations. The various capabilities supported by SUPL may significantly improve location support for mobile devices and may enable more accurate and reliable location of a mobile device in comparison to methods that rely on simple standalone positioning support in a mobile device based on measurements of, for example, the US Global Positioning System (GPS).

In devices that make use of SUPL services, the standard implementation involves a mobile device being assigned a fixed single home SLP (H-SLP) based on a pre-provisioned setting with the H-SLP being associated with either a home operator for the mobile device or some other preferred provider of location services. A device uses the pre-provisioned setting, which is the H-SLP address, to establish a connection with the device's single H-SLP when engaging in a SUPL location session. Information about additional local devices (e.g. wireless base stations and WiFi access points (APs) whose signals can be received by the device and used to help determine the device's current location) may then be accessed via the H-SLP. SUPL also defines more local SLPs, known as Discovered SLPs (D-SLPs) that may in some scenarios provide more extensive and appropriate information (e.g. better assistance data) to a device than its H-SLP. For example, when a device is roaming in a distant location from its H-SLP or is at a location (e.g. inside a building or at a venue for which its H-SLP has little or no information), a D-SLP nearby to the device (e.g. associated with the same building or venue within which the mobile device may be located) may be able to provide assistance data containing information for more base stations and access points local to the device than the device's H-SLP. This additional information may enable improved location support based on the device acquiring and measuring signals from these additional base stations and access points. An ability to discover and make use of suitable D-SLPs may therefore be an advantage to mobile devices and their users.

BRIEF SUMMARY

Various embodiments described herein include systems, methods, apparatus, and computer readable media for providing network based and network assisted positioning services to a mobile electronic device.

For example, one embodiment may be a method of supporting location services at a mobile device comprising: receiving at the mobile device an identity of a first location provider; querying a home location server for authorization to a first location server associated with the first location provider; receiving an authorization from the H-SLP for access to a second location server associated with a second location provider; querying the second location server for authorization to the first location server; receiving an authorization to access the first location server from the second location server; and accessing the first location server to receive location services.

Further embodiments of such a method may additionally function where the home location server is an H-SLP. Further embodiments of such a method may additionally function where the second location server is a D-SLP. Further embodiments of such a method may additionally function where the first location server is a D-SLP. Further embodiments of such a method may additionally function where the first and second location providers have a business relationship. Further embodiments of such a method may additionally function where the identity of the first location provider comprises an identity of an area supported by the first location provider.

Further embodiments of such a method may additionally comprise receiving at the mobile device the identity of the first location server wherein the querying of the home location server and the querying of the second location server include providing the identity of the first location server. Further embodiments of such a method may additionally comprises receiving at the mobile device the identity of the second location provider wherein the querying of the home location server and the querying of the second location server include providing the identity of the second location provider.

Further embodiments of such a method may additionally function where receiving at the device, identities for the first location server and the associated location provider comprises receiving a business name from an access point (AP) controlled by the first location server; wherein the first location server is a first discovered SLP server (D-SLP) and wherein the second location server is a second D-SLP.

Further embodiments of such a method may additionally function where querying the H-SLP for authorization to the first location server comprises: initiating a first SUPL session with the H-SLP; and communicating the business name and a media access control (MAC) address of the AP to the H-SLP. Further embodiments of such a method may additionally function where receiving the authorization from the H-SLP for the second location server associated with the associated location provider comprises receiving an IP address and first authentication data for the second location server; and ending the first SUPL session with the H-SLP.

Further embodiments of such a method may additionally function where querying the second location server for authorization to the first location server comprises: initiating a second SUPL session with the second D-SLP; and communicating the first authentication data to the second D-SLP as part of the second SUPL session. Further embodiments of such a method may additionally function where receiving the authorization to the first location server from the second location server comprises: receiving second authentication data from the second D-SLP as part of the second SUPL session; and ending the second SUPL session.

Further embodiments of such a method may additionally function where accessing the first location server comprises: communicating the second authentication data to the AP associated with the first D-SLP; and receiving approval from the first D-SLP to access a wide area network Internet connection via the AP using the device. Further embodiments of such a method may additionally function where accessing the first location server comprises: initiating a third SUPL session with the first D-SLP using the second authentication data; and requesting assistance data (AD) from the first D-SLP.

Further embodiments of such a method may additionally comprise receiving map data from the first D-SLP. Further embodiments of such a method may additionally comprise performing a position measurement of the device using the first D-SLP and the AP. Further embodiments of such a method may additionally function where the request for AD further comprises a generic advertising service (GAS) initial request.

Further embodiments of such a method may additionally comprise receiving, from an advertising server via the first D-SLP, advertising information as part of a GAS response; receiving an approval for display of the advertising information at the device; and receiving AD at the device in response to the approval for display of the advertising information at the device. Further embodiments of such a method may additionally function where the identities for the first location server and the associated location provider are received as part of a broadcast message from an access point. Further embodiments of such a method may additionally comprise receiving from the first location server, a time limit for the first location server to provide assistance data.

Another embodiment may be a device comprising: means for receiving at the mobile device an identity of a first location provider; means for querying a home location server for authorization to a first location server associated with the first location provider; means for receiving an authorization from the H-SLP for access to a second location server associated with a second location provider; means for querying the second location server for authorization to the first location server; means for receiving an authorization to access the first location server from the second location server; and means for accessing the first location server to receive location services. Further embodiments may comprise means for operating a location based services (LBS) application. Further embodiments may comprise means for communicating with the first location server via the LBS application.

Still another embodiment may be a non-transitory computer readable instruction medium comprising instructions that, when executed by a processor of a mobile device, cause the mobile device to perform a method comprising: receiving at the mobile device an identity of a first location provider; querying a home location server for authorization to a first location server associated with the first location provider; receiving an authorization from the H-SLP for access to a second location server associated with a second location provider; querying the second location server for authorization to the first location server; receiving an authorization to access the first location server from the second location server; and accessing the first location server to receive location services.

Further embodiments may function where the method further comprises receiving map data from the first location server and performing a position measurement of the device using the first location server and an access point associated with the first location server. Further embodiments may function where the method further comprises: communicating a generic advertising service (GAS) initial request to the first location server with a request for assistance data (AD); receiving, from an advertising server via the first location server, advertising information as part of a GAS response; receiving an approval for display of the advertising information at the device; and receiving AD at the device in response to the approval for display of the advertising information at the device.

Another embodiment may be a mobile device comprising: a memory; and a processor coupled to the memory, wherein the processor is configured to: receive at the mobile device an identity of a first location provider; query a home location server for authorization to a first location server associated with the first location provider; receive an authorization from the H-SLP for access to a second location server associated with a second location provider; query the second location server for authorization to the first location server; receive an authorization to access the first location server from the second location server; and access the first location server to receive location services.

Another embodiment may function where the processor is further configured to execute a location based services (LBS) application and communicate with the first D-SLP via the LBS application.

Another embodiment may be a method comprising: receiving, at a discovered secure user platform location (SUPL) server (D-SLP) a request from a device for authorization to access a second D-SLP; authenticating information from an H-SLP received as part of the request to access the second D-SLP; and communicating an authorization to access the second D-SLP to the device after authenticating the information from the H-SLP.

Another embodiment may function where the authorization to access the second D-SLP comprises an authorization time limit. Another embodiment may function where the authorization to access the second D-SLP comprises an authorization area limit that limits access by the device to assistance data (AD) for a predefined area.

Another embodiment may be a discovered secure user platform location (SUPL) server (D-SLP) comprising: means for receiving, at the D-SLP a request from a device for authorization to access a second D-SLP; means for authenticating information from an H-SLP received as part of the request to access the second D-SLP; and means for communicating an authorization to access the second D-SLP to the device after authenticating the information from the H-SLP.

Another embodiment may further comprise: means for determining a time limit associated with the authenticating information from the H-SLP. Another embodiment may further comprise: means for identifying an advertising server to provide advertising information to the device as part of the authorization to access the second D-SLP.

Another embodiment may be a non-transitory computer readable instruction medium comprising instructions that, when executed by a processor perform a method comprising: receiving, at a discovered secure user platform location (SUPL) server (D-SLP) a request from a device for authorization to access a second D-SLP; authenticating information from an H-SLP received as part of the request to access the second D-SLP; and communicating an authorization to access the second D-SLP to the device after authenticating the information from the H-SLP.

Another embodiment may function where the method further comprises: communicating a set of authorized assistance data functions associated with the first D-SLP to the device. Another embodiment may function where the method further comprises communicating a SUPL end message with the authorization to access the second D-SLP. Another embodiment may be a discovered secure user platform location (SUPL) server (D-SLP) comprising: a memory; and a processor coupled to the memory, wherein the processor is configured to: receive a SUPL start message from a device initiating a SUPL session; receive a request from the device for authorization to access a second D-SLP as part of the SUPL session; authenticate information from an H-SLP received as part of the request to access the second D-SLP; and communicate an authorization to access the second D-SLP to the device after authenticating the information from the H-SLP as part of the SUPL session.

Another embodiment may function where the processor is further configured to: address a database of SLP relationships to verify the information from the H-SLP. Another embodiment may function where the processor is further configured to communicate a message to the H-SLP as part of the authentication of the information from the H-SLP; and receive a verification message from the H-SLP as part of the authentication of the information from the H-SLP.

While various specific embodiments are described, a person of ordinary skill in the art will understand that elements, steps, and components of the various embodiments may be arranged in alternative structures while remaining within the scope of the description. Also, additional embodiments will be apparent given the description herein, and thus the description is not referring only to the specifically described embodiments, but to any embodiment capable of the function or structure described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
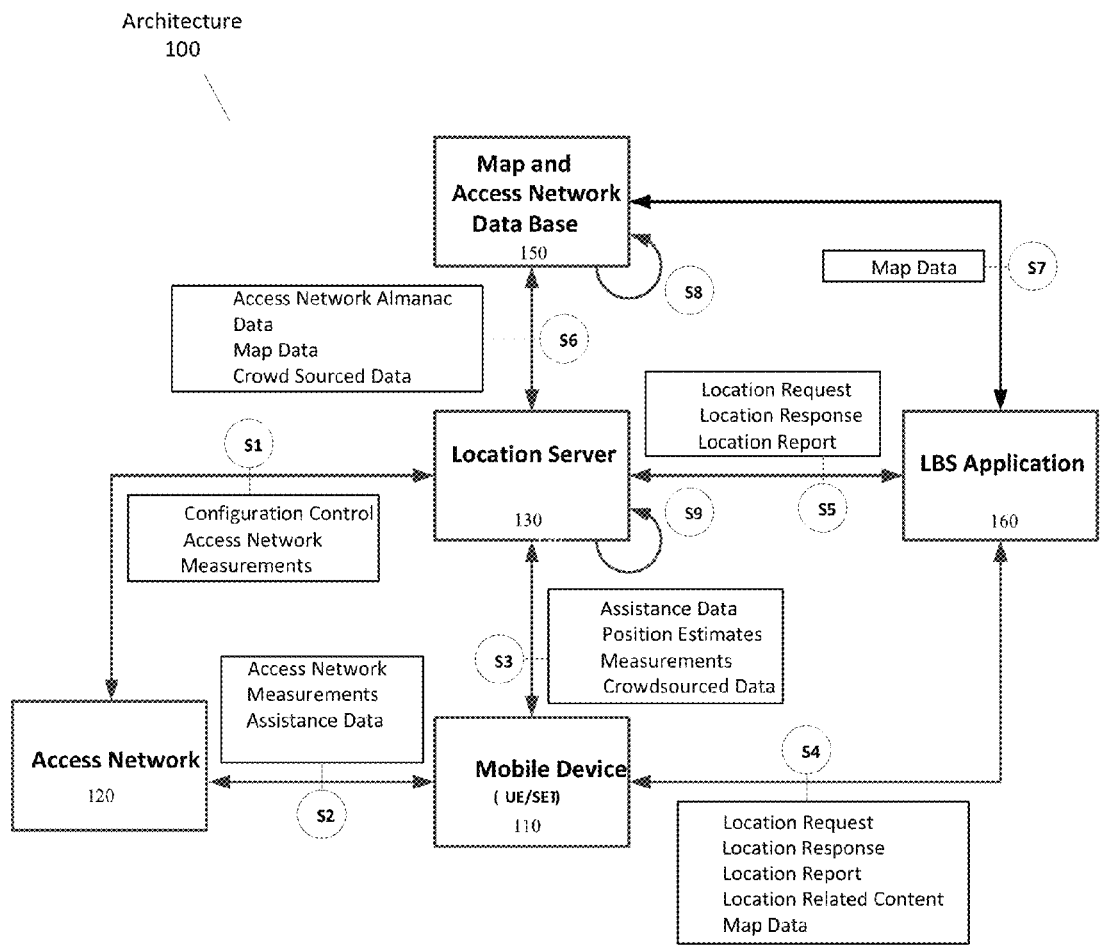
FIG. 1 is a system diagram illustrating a system for use with embodiments presented herein.

Embodiments disclosed herein are related to systems for providing location services and for determining a position of an electronic device. In certain embodiments, a framework is provided to support global and regional location services alongside and integrated with highly local position services. Such systems may provide security and reliability features of a regional or global system in conjunction with the highly specialized local information of a local position service in an integrated fashion. Such embodiments may further enable local support of indoor positioning in private or semi-private spaces integrated with regional or global systems. Aspects of such embodiments may additionally relate to SUPL SLP servers, to determine the location of a computing device.

I. Overview of Network Based and Network Assisted Location Services According to Various Embodiments Terms recited herein may be used to encompass functionality or features as described below. Other functionality and/or features may instead or additionally be utilized in some embodiments. SUPL is a location solution based on interaction between a SET and an SLP using TCP/IP as a transport mechanism in which SUPL messages, defined according to the SUPL User Plane Location Protocol (ULP), are exchanged between a SET and an SLP to set up and manage SUPL location sessions and to transport needed assistance data, location information (e.g. location estimate and/or location measurements) and SUPL and positioning capabilities. A SUPL session may typically employ one or more positioning protocols that may convey some or all of the assistance data transferred from an SLP to a SET and some or all of the location measurements and/or location estimate transferred from the SET to the SLP. Typically, certain SUPL messages (e.g., a SUPL POS message) may carry one or more embedded messages defined according to a positioning protocol as a means of invoking and supporting positioning within a SUPL session. Examples of positioning protocols supported by SUPL include Radio Resource Location Services (LCS) Protocol (RRLP), Radio Resource Control Protocol (RRC), LTE Positioning Protocol (LPP), IS-801 and LPP Extensions (LPPe). Typically, LPPe may extend LPP such that an LPP positioning protocol message may contain an embedded LPPe message. RRLP, RRC and LPP are defined by an organization known as the 3rd Generation Partnership Project (3GPP), IS-801 is defined by an organization known as the 3rd Generation Partnership Project 2 (3GPP2) and LPPe is defined by OMA, all in publicly available documents. The terms location, location estimate, position and position estimate are used interchangeably herein and refer to a location of a mobile device which may be expressed in absolute terms (e.g. using latitude, longitude and possibly altitude coordinates), or in a civic form (e.g. as a postal address) or in relative terms (e.g. as a distance and direction from some other known location).

A mobile device or SET may be referred to as a User Equipment (UE), mobile terminal, terminal, wireless device, device, mobile station or by some other name. Examples of a SET are cellphones, smartphones, laptops, tablets or any IP enabled direction providing electronics, though any computing device with location services may function as a SET in various embodiments described herein. Typically a SET will support wireless communications using such radio technologies as Global System for Mobile Communications (GSM), Code Division Multiple Access (CDMA), Wideband CDMA (WCDMA), Long Term Evolution LTE), High Rate Packet Data (HRPD) and IEEE 802.11 WiFi. GSM, WCDMA and LTE are technologies defined by 3GPP. CDMA and HRPD are technologies defined by 3GPP2. A SET may also or instead support wireline communication using broadband access from a Local Area Network (LAN) or using Packet Cable or DSL.

A Home SLP (H-SLP) is a particular kind of SUPL location server, and may include the SLP that is directly associated with and/or primarily responsible for providing location services to a particular SET, for example through a network contract that may be associated with a cellular phone carrier service. A Discovered SLP (D-SLP) may include an SLP operated by a particular business or the owner of a venue (e.g. a hospital, airport, shopping mall, sports stadium) or a local network service provider that may each provide improved location services to a SET within a defined D-SLP service area compared to services a SET may otherwise receive from an H-SLP.

An access point (AP) may refer to any transmission point that communicates with a nearby mobile device, such as a wireless transmitter according to any number of IEEE standards (for example one or more of the 802.11 standards) or using Bluetooth or other short range wireless technologies.

SUPL location support may be provided to a SET by an H-SLP communicating over IP with the SET. In certain areas and environments, however, an H-SLP may have limited ability to communicate effectively with the SET and/or to provide the SET with appropriate location assistance data and/or compute an accurate location estimate from location measurements that a SET was able to obtain. Examples of such areas may be indoor locations, or locations where a third party has important location related information that the H-SLP does not have access to. In such environments a D-SLP may be implemented by a local service provider or venue owner to provide improved local information to a SET. In some scenarios, a D-SLP may be supported by a provider separate from a local service provider or venue owner but where there is a business relationship to provide location services to SETs who are within a certain area owned or associated with the local service provider or venue owner. In some scenarios, a D-SLP may be local to a particular service area (e.g. a venue or building) and may be referred to as a "local D-SLP" and may then be operated specifically to provide location services to this particular service area, In certain other scenarios, a D-SLP may be regional and may be referred to as a "regional D-SLP" and may support location services in a number of local services areas throughout a certain region such as a town, city, county, state or other extensive area. In still other scenarios, a D-SLP may be global and may be referred to as a "global D-SLP" and may then support location services in a number of services areas throughout a whole country or over the entire world.

An H-SLP provider may negotiate with a D-SLP provider to allow a SET subscriber of the H-SLP to have access to the D-SLP as part of a business relationship between the H-SLP provider and the D-SLP provider, for example. When a SET discovers that it is in a location with a D-SLP, the SET may query its H-SLP for authorization to access the D-SLP for location services through an authorization process. If access to the D-SLP is authorized by the H-SLP, the SET may then access the D-SLP to obtain location services such as receiving assistance data to support location determination or sending location measurements to the D-SLP for the D-SLP to compute a location estimate and return it to the SET. In some scenarios, a SET may be in some local area (e.g. inside a venue such as a shopping mall, airport, hospital, college campus) where adequate location support is not possible from its H-SLP but where the SET is not aware of a particular D-SLP that may provide better location services. In such a scenario, a SET may query its H-SLP to provide the address of some D-SLP authorized by the H-SLP to provide location services for the SET in the current local area. In such a query interaction, the H-SLP may both supply the address of a D-SLP and authorize access to the D-SLP in the same interaction.

In certain embodiments, a local D-SLP may have improved local information as compared with a regional D-SLP, a global D-SLP or an H-SLP due to being owned or operated in association with a building owner or venue owner who has access to information such as building floor plans, layout of a campus and/or placement of APs and base stations that are not so easily accessible to the providers of global or regional D-SLPs or an H-SLP. For example, the owner of a multi-story library may uniquely be able to provide specific location information around stacks of books and staircases within the library or the owner of a large building may be able to provide specific non-public information related to interior walls and corridors in the building, including emergency exit paths for example. One other example of this may be specific information related to the characteristics (e.g. WiFi radio interface types and WiFi AP addresses) and placements (e.g. relative or absolute location coordinates) of local wireless access points (e.g. WiFi APs) within a building or venue. WiFi APs may be used in conjunction with SUPL and an SLP to support location of a mobile device. Those of skill in the art will appreciate that while the term WiFi is used to describe certain embodiments, this term does not limit the scope of these embodiments. Rather, these embodiments may utilize any WLAN or wide area signaling and/protocols in certain implementations. For example, Bluetooth technology, LTE or WCDMA may be utilized in certain embodiments instead of or in addition to WiFi. In addition, cellular base stations, such as Femtocells or home base stations, may be used in place of APs and WiFi APs.

Provision of commercial location services to mobile wireless users may include various forms. Two of these are described below. The first form is provision of a standards based user plane location service such as SUPL by a wireless operator to its subscribers as described previously herein.

The second form is provision of a proprietary location service by a vendor, service provider or wireless operator such as those provided by Qualcomm™ or Nokia™ or a global service provider such as Google™ to its users. In both cases, user devices are provided with the address or addresses of location servers belonging to the service provider which can be used to establish a location session when the device would like to determine its location. This may change as small local providers such as owners of shopping malls, airports, hospitals, convention centers, office buildings, and university campuses seek to provide reliable and accurate location services and associated services or applications. Such services and applications may include advertising, direction finding, and/or information services among others, which operate over the local areas that these small local providers control. In such cases, local providers may use local servers to provide location services. Such local servers may be able to provide superior location services to users inside the associated local areas. This may be due to better knowledge of radio sources such as WiFi and Bluetooth access points that may be used to obtain location and better knowledge of building and/or venue layout which may be used to provide mapping data and building floor plans. Other WLAN transmitters or other types of access points may be known in some embodiments. Local servers may also have access to other information such as points of interest relevant to location derivation and/or location usage.

One potential issue in certain implementations of local location related services may be in making devices in the local areas aware of the existence of local location servers. In particular, devices not only need to obtain the address of any local location server but also receive an authorization from a trusted source such as an H-SLP which may verify that a local location server can be considered as a trustworthy source of location services and other related services in the local area. Such trustworthiness may be important from a privacy and security standpoint whereby location information obtained for a particular mobile device will not be provided by a location server to clients not authorized by the user of the mobile device to receive this information. In addition, authorizing a location server may be needed to assure a mobile device in advance that the owner of the location server will be able to bill the user of the mobile device or the mobile user's home network operator or H-SLP provider for any location services provided to the user as opposed to not receiving such location services due to an inability to bill for these services.

To assist with accessing a local location server such as a local SLP, the concept of an SLP provider may be used. An SLP provider may be the owner or operator of an SLP. An SLP provider may be global, regional or local according to the type of SLP that it deploys. Providers may have relationships with one another such that an H-SLP or D-SLP belonging to a provider A may authorize any D-SLP belonging to another provider B (and possibly vice-versa). The address of an SLP which may be a Fully Qualified Domain Name (FQDN) may include the provider name as a means of associating an SLP to a particular provider. A mobile device (e.g. SET) may be able to discover the SLP provider for a local area—e.g. via WiFi interaction with a locally accessible WiFi AP or from WiFi AP broadcast information.

Embodiments described herein provide an architectural framework that can support coexistence of and coordination between traditional global or regional user plane location services from operators, vendors and other major service providers and location services from small providers within small local areas. The framework allows for partnerships between various location providers, where a major provider like Cisco™, Nokia™ or Qualcomm™ could support location services from small providers via equipment sales and/or service management. Certain embodiments comprise methods and procedures that are defined to enable optimal location server discovery by a device when in any local provider's area regardless of the service provider normally used by the device. Although the embodiments described herein relate generally to the OMA SUPL location solution and to location servers that are different types of SUPL SLPs, it may be seen by those with normal ability in the art that the embodiments can be extended to other location solutions and to location servers other than SUPL SLPs—e.g. to enable discovery of local location servers other than SLPs.

II. Embodiments of Systems for Network Based and Network Assisted Location Services FIG. 1 shows one potential implementation of a system in accordance with the present innovations. FIG. 1 shows an architecture 100 that includes Mobile Device (or SET) 110, access network 120, Location Server 130, Map and Access network database 150, and location based service (LBS) application 160. As described above, mobile device 110 may be any device that uses location based services, for example SUPL location services, such as a mobile phone, tablet, computer, or a global positioning system (GPS) device. Access network 120 may include wireless and Bluetooth access points, as well as any other network component that enables a mobile device 110 to communicate with a network such as the Internet and/or some internal intranet associated with a venue or building. Although mobile device 110 and location server 130 may support SUPL, there may be implementations of architecture 100 in which mobile device 110 and location server 130 support other location service solutions such as solutions defined by the Internet Engineering Task Force (IETF) or 3GPP or 3GPP2.

Location server 130 may be an SLP server, such as a D-SLP or H-SLP server as described above, but may be any location server that provides location services in a manner consistent with the embodiments described herein. Map and access network database 150 may comprise data such as map data, location information, points of interest, or other data that may be used by a location service. This information may derive from a third party service, a crowd sourced database (which may collect location related information provided by mobile devices such as mobile device 110), or from any suitable source that provides information relevant to location services. LBS application 160 may be an application, program, server computer, or service that uses location information. Examples include map programs on computing devices that show current locations using location services, and that provide directions based on a current location. LBS application 160 may further use information obtained from database 150 as well as location information obtained from location server 130 to provide application information to a mobile device 110. LBS application 160 may provide various location related services to mobile device 110 and/or to the user of mobile device 110 such as direction finding and navigation within a particular local area (e.g. building or venue) and/or provision of information about a particular local area that may be related to mobile device 110 being inside the local area or being at or nearby to some particular location in the local area. Such location related information may include information on a particular sales event inside a shopping mall, the whereabouts of a particular product or service of interest to the user of mobile device 110, nearby vacant car parking space, etc.

Additional examples of data flows within architecture 100 are shown in elements S1 through S9 of FIG. 1, which show illustrative non-limiting examples of communications links, which may also be referred to as interfaces, between the above listed portions of FIG. 1. With interface S1, access network 120 may provide access network measurements made of mobile device 110 to location server 130 to enable location server 130 to locate mobile device 110. Further, with interface S1, location server 130 may configure access network 120 to make particular measurements of mobile device 110 and provide them to location server 130 (e.g. measurements or information related to detection of mobile device 110 and/or the timing, strength and/or direction of arrival of signals received from mobile device 110). With interface S2, access network 120 may transfer assistance data for location services to mobile device 110 which access network 120 may have been configured with or may have obtained from location server 130. Transfer of assistance data over S2 from access network 120 to mobile device 110 may occur point to point and/or may make use of broadcast from access network 120 to multiple devices (including but not limited to mobile device 110). The assistance data transferred may provide information on one or more APs whose signals may be measured by mobile device 110 to obtain its location. With S2, access network 120 may also transfer to mobile device 110 measurements made by access network 120 of signals received from mobile device 110. In addition with S2, mobile device 110 may transfer to access network 120 location related measurements of signals received by mobile device 110 from access network 120 and access network 120 may make measurements of signals received from mobile device 110. With interface S3, as part of the primary function of a system for providing positioning services, location server 130 may transfer location related assistance data to mobile device 110 and mobile device 110 may transfer positioning measurements, location estimates, and/or crowd-sourced measurement data to location server 130. The various interactions and transfers on S3 may be defined according to the SUPL ULP protocol in some embodiments. In further embodiments, SUPL ULP used on S3 may employ LPP and/or LPP/LPPe as positioning protocols as defined and allowed by the SUPL location solution defined by OMA in SUPL versions 2.0, 2.1 and 3.0. With interface S4, LBS application 160 may send to mobile device 110 a location request, map data and/or location related content such as navigation and direction finding data. In addition on S4, mobile device 110 may send to LBS Application 160 a location response and/or a location report (e.g. in response to a location request from LBS Application 160) and may also or instead send a request to LBS Application 160 for map data and/or other location related content. With interface S5, LBS application 160 may send to location server 130 a location request (e.g. related to mobile device 110) and/or a configuration request related to reporting the presence and/or location of mobile device 110. Further on S5, location server 130 may send to LBS Application 160 a location response and/or location report (e.g. in response to a location request and/or configuration request received earlier from LBS Application 160). To support the interactions on the S5 interface, the Mobile Location Protocol (MLP) defined by OMA in publicly available documents may be used in some embodiments. MLP may also be used in some embodiments to support interactions on interface S4. With interface S6, access network database 150 may transfer to location server 130 map data and/or access network related data (e.g. access network almanac data for access network 120 that may contain the locations and/or transmission characteristics of APs in access network 120). Further in S6, location server 130 may transfer to Map and Access Network Database 150 crowd sourced location related data which may concern access points and/or base stations in access network 120 and may have been obtained, at least in part, by location server 130 from access network 120 and/or from mobile device 110. Similarly, with interface S7, LBS application 160 may request and obtain map data from map and access network database 150. With interface S8, multiple various map and access network databases may share information—e.g. may transfer map data, access network almanac data and/or crowd sourced location data from one database to another as a means of providing additional access to such data to other instances of architecture 100 at other locations. Such information may be crowd-sourced or gathered from expert resources, and may thus initially be received at a single database before being shared with a network of map and access network databases. Similarly, with interface S9, multiple location servers may share information with each other—e.g. may share access network almanac data and/or map data received from one or more Map and Access Network Databases 150.

Figure 2:
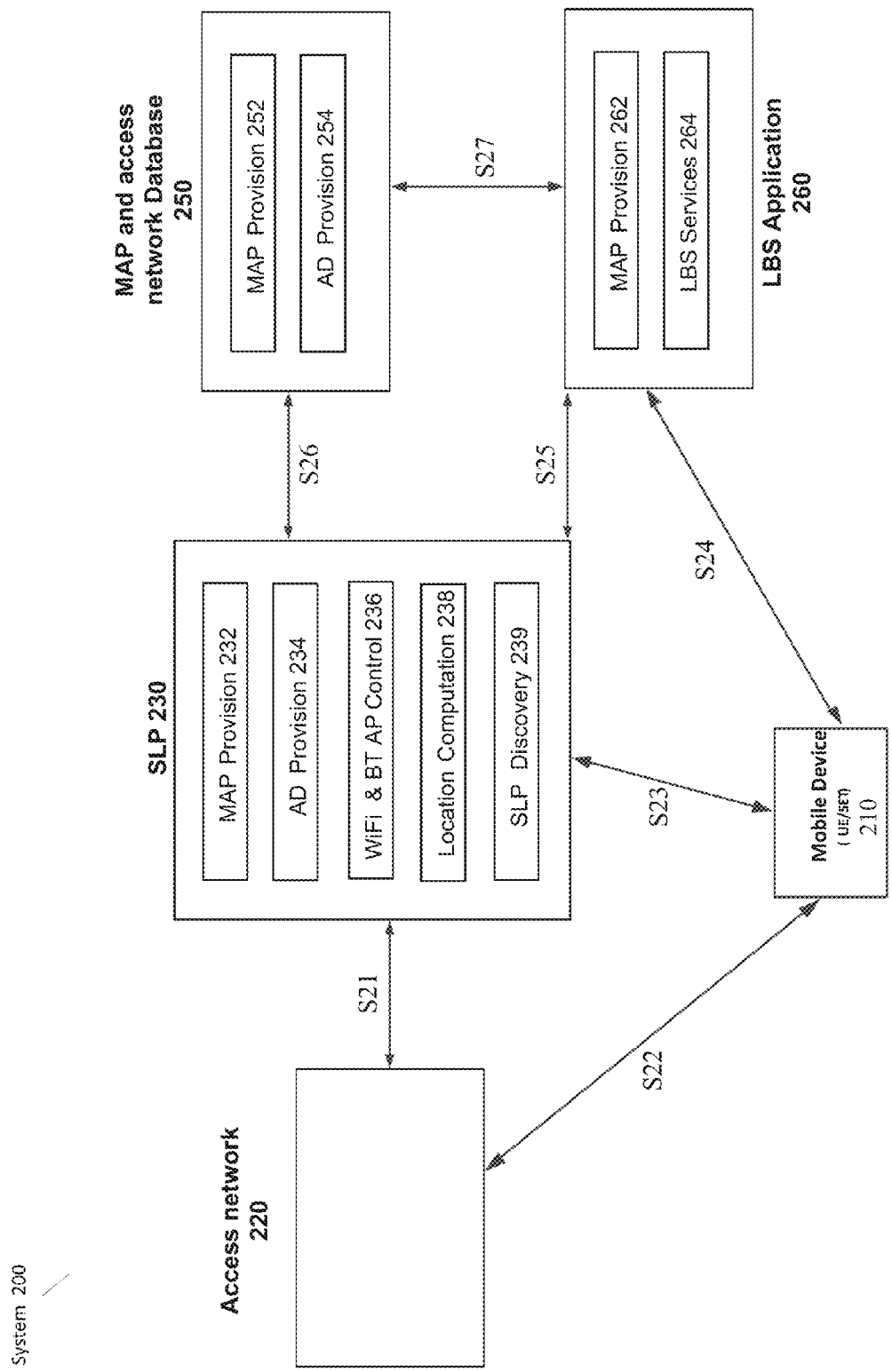
FIG. 2 is a system diagram illustrating a system for use with embodiments presented herein.

FIG. 2 shows an additional alternative embodiment of architecture 200 according to the innovations presented herein. FIG. 2 includes user equipment (UE) as mobile device (or SET) 210, access network 220, SLP 230, map and access network database 250, and LBS application 260. FIG. 2 additionally shows a set of communication links between the various components that may function as described later herein. Architecture 200 may correspond to architecture 100 and may exemplify additional modules (or additional functional components) of certain elements in architecture 100. In this correspondence, elements 110, 120, 130, 150 and 160 in architecture 100 may correspond to elements 210, 220, 230, 250 and 260, respectively in architecture 200 and links (or interfaces) S1, S2, S3, S4, S5, S6 and S7 in architecture 100 may correspond to links (or interfaces) S21, S22, S23, S24, S25, S26 and S27, respectively, in architecture 200.

SLP 230 in architecture 200 may include the following modules (or functional components): (i) map provision 232 which may provide map AD to SET 210; (ii) AD provision 234 which may provide other location related AD to SET 210; (iii) WiFi AP and Bluetooth (BT) AP control 236 which may configure and control access network 220 to report location related information (e.g. location measurements) for SET 210 and may provide SET 210 with assistance data either point to point or via broadcast; (iv) location computation 238 which may compute a location for SET 210 based on location related measurements received from access network 220 and/or from SET 210; and (v) SLP discovery 239 which may enable discovery of a local or more local SLP for SET 210 than SLP 230 and may support SLP interactions described later herein with reference to FIGS. 3, 6 and 7. Map and Access Network Database 250 may include (i) a map provision 252 module (or functional component) which may provide map data (e.g. floor plans, building plans, street maps) to SLP 230 and/or to LBS application 260 and (ii) an AD provision 254 module (or functional component) which may provide AD (e.g. access network almanac data) to SLP 230 and/or to LBS Application 260. Similarly LBS application 260 may include (i) a map provision 262 module (or functional component) which may provide map data (e.g. obtained from map and access network database 250) to SET 210 and (ii) an LBS Services 264 module (or functional component) which may provide various location related services to SET 210 such as navigation assistance and direction finding. In various embodiments, these modules (or functional components) may be separate hardware modules, separate devices operating within a network of computers, separate software modules or programs or processes operating on a single computer, or may be any combination of hardware, firmware, or software modules operating on a computing device. Map provision modules 232, 252, and 262 may work separately or in conjunction to store and provide map information to devices such as SET 210. AD provision modules 234 and 254 may similarly function to provide assistance data to mobile devices such as SET 210. This assistance data may work in conjunction with map data from map provisioning modules. The assistance data may additionally include text directions, map directions, location details, or any other assistance data requested by a user or application of SET 210. WiFi and BT AP Control 236 may function to provide information related to specific access points to SET 210. In certain embodiments where APs may have controllable functionality, such as the ability to provide secure ranging measurements, WiFi and BT AP control 236 may communicate with APs that are part of access network 220 to coordinate communications with and measurements of SET 210. Similarly, WiFi and BT AP control 236 may manage any similar functionality of access network 220 or APs within access network 220. SLP discovery 239 may function to manage discovery and/or authorization for additional local SLP computing devices for mobile device 210 when another SLP may have specialist information of interest to mobile device 210 that is not available from SLP 230.

Assistance Data (AD) provided to SET 210 by SLP 230 and/or by access network 220 may contain information (e.g. addresses, location coordinates, coverage areas, transmission characteristics) for APs and base stations that may be part of access network 220, or may be part of any other access network.

In certain embodiments, crowd sourcing of UE measurements of APs may be implemented. Such a system may enable an SLP 230 to request a SET 210 to provide information such as addresses and measurements for local APs. A SET 210 may also provide this information unsolicited to an SLP 230 via a trigger or rule for information sharing. Certain embodiments may also enable a SET 210 to provide crowd sourcing information to its H-SLP when the UE is otherwise using a local D-SLP (e.g. a D-SLP that may be SLP 230).

Architectures 100 and 200 exemplified in FIGS. 1 and 2 may support location services for mobile devices that are inside a venue (e.g. airport, shopping mall, hospital, library, convention center, college campus etc.) or otherwise in some indoor environment or other environment (e.g. a dense urban environment) where accurate and reliable location may not always be possible using a standard location solution such as SUPL coupled to a fixed location server like an H-SLP. However, support of accurate and reliable location may be dependent on a mobile device (such as mobile device 110 or SET 210) being able to access a location server (such as location server 130 or SLP 230) that is local to the environment the mobile device is in. In some scenarios, a SET (e.g. mobile device 110 or SET 210) may not be aware of a local location server or local SLP (such as location server 130 or SLP 230). Although the SET could query its H-SLP for the address of an authorized D-SLP at its current location (such as an address for location server 130 or SLP 230). It may be difficult to discover such a local D-SLP in one step from an H-SLP since the H-SLP may not have information for any location providers for the local area (e.g. venue or building) that the SET is inside. For example, suppose a SET S has an H-SLP H, is at a location L and receives signals from a WiFi AP with Media Access Control (MAC) address A whose provider is P1. If the AP MAC address A, location L and provider P1 are unknown to H-SLP H, then H-SLP H may not be able to provide a local D-SLP address to SET S. However, location L and/or MAC address A and/or provider P1 may be known to some regional or global D-SLP D due to a business relationship between the global or regional provider P2 of D-SLP D and the local provider P1. if the SET S can then also indicate to its H-SLP H that the local provider P1 has a relationship to provider P2 and if the H-SLP H provider has a business relationship to provider P2, then it may be possible for H-SLP H to provide to SET S the address of D-SLP D associated with provider P2. D-SLP D may then be able to provide the address of a local D-SLP for provider P1 to SET S. This leads to a two step SLP discovery process in which provider names are made available to a SET to assist the discovery. The process is exemplified in FIG. 3 as described next.

Figure 3:
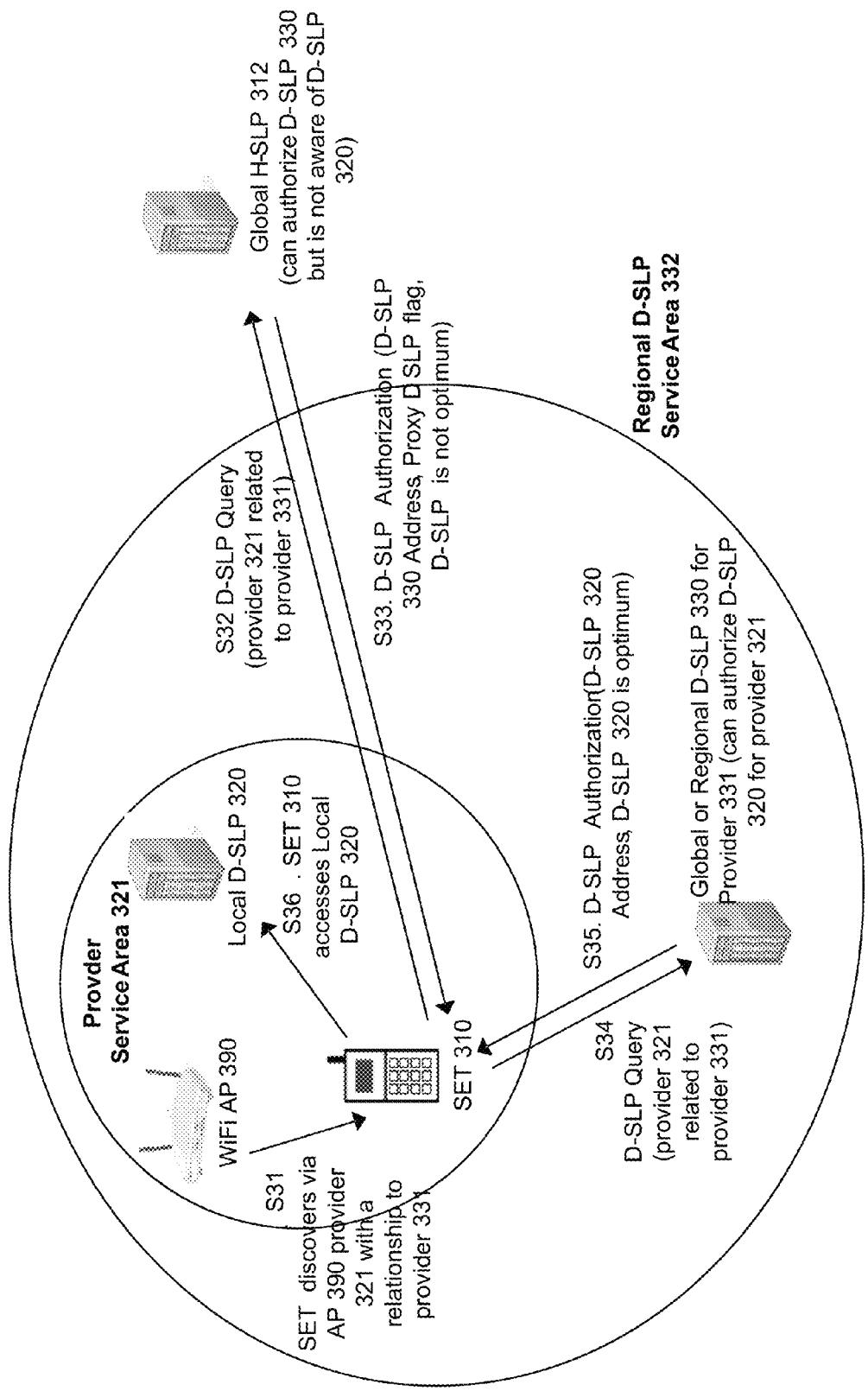
FIG. 3 is a system diagram illustrating a system for use with embodiments presented herein.

FIG. 3 shows another alternative embodiment of a system according to the innovations presented herein, particularly detailing a multi-tiered or hierarchical SLP system for enabling a SET 310 to discover an authorized local D-SLP 320 belonging to a venue provider 321 using authorizations with H-SLP 312 and Regional (or Global) D-SLP 330. As shown in FIG. 3, Local D-SLP 320 may have specialized information for provider 321's service area, while regional D-SLP 330 may have a wider service area 332 without the local specialized information contained by D-SLP 320. Local D-SLP 320 may correspond, for example, to location server 130 in FIG. 1 or to SLP 230 in FIG. 2. In step S31 of FIG. 3, SET 310 may be within the service area of provider 321 and may discover provider 321 (e.g. may discover an identification for provider 321) from information received (e.g. via broadcast or point to point) from WiFi AP 390 that is operated as part of a venue supported by provider 321. SET 310 may further discover that provider 321 has a business relationship with another provider 331 (not shown directly in FIG. 3). For example, provider 321 and provider 331 may be identified in information broadcast from WiFi AP 390 or may be provided to SET 310 when SET 310 sends a query to WiFi AP 390. In step S32, a query for a local authorized D-SLP is sent to by SET 310 to SET 310's H-SLP 312 indicating local provider 321 and that this provider has a business relationship to provider 331. It should be noted that while H-SLP 312 is described as a SUPL home SLP in FIG. 3, H-SLP 312 may be any home location server for SET 310 that may or may not implement SUPL without loss of generality in this description. H-SLP 312 may then determine that it does not have information for provider 321 (e.g. is not aware of D-SLP 320 or provider 321) but does have information for provider 331 due to a business relationship between the provider of H-SLP 312 and provider 331. For example, because provider 331 is a regional or global provider and may have business relationships with many local providers such as provider 321, the provider of H-SLP 312 may consider it worthwhile (e.g. simpler or more economic) to have one relationship with provider 331 rather than many relationships with some or all of the local providers with business relationships to provider 331. In step S33 H-SLP 312 may therefore authorize SET 310 to use services from D-SLP 330 belonging to provider 331. In certain embodiments, this authorization may indicate that D-SLP 330 is a proxy D-SLP with an ability to authorize other D-SLPs (such as D-SLP 320) that are more local to SET 310 and may further indicate that D-SLP 330 is not optimum for SET 310 because of the possible existence of other more local SLPs such as D-SLP 320. When SET 312 receives the authorization in step S33, it may determine that although D-SLP 330 might be used to receive location services at the current location of SET 310, there may be a better more local D-SLP that may be discovered and authorized by D-SLP 330. Accordingly, in step S34, SET 310 may send a query to D-SLP 330 requesting authorization of a more local D-SLP and may include in this query the identity of provider 321 and that provider 321 is related to provider 331. Because, in this example, the provider 331 of D-SLP 330 has a business relationship to provider 321, D-SLP 330 may have information on a local D-SLP 320 owned by provider 321 (or operated by another party on behalf of provider 321). In such a case, at step S35, D-SLP 330 may authorize D-SLP 320 to SET 310 by providing the address (e.g. FQDN) of D-SLP 320 to SET 310 and may indicate that D-SLP 320 is optimum. Finally, in step S36, due to the authorization of D-SLP 320 in step S35 and the indication that D-SLP 320 is optimum, SET 310 may access D-SLP 320 to obtain location services. This access may further include provision of location assistance services implemented through WiFi AP 390 in conjunction with D-SLP 320. Those of skill in the art will appreciate that while the term WiFi is used to describe certain embodiments, this term does not limit the scope of these embodiments. Rather, these embodiments may utilize any WLAN signaling and/protocols in certain implementations.

In conjunction with a multi-step discovery and authorization process exemplified above in association with FIG. 3, WiFi Service Set Identifiers (SSIDs) may be used as provider names. Such SSIDs may conform to a certain format or contain certain key characters to indicate support of certain provider names. Associated well known global/regional providers may be indicated using special codes (e.g. "QC", "NK", "CS"). Since SSIDs may be broadcast by WiFi APs (e.g. WiFi AP 390 in FIG. 3) using existing IEEE 802.11 signaling, a mobile device (e.g. SET 310 in FIG. 3) that receives a SSID containing a provider name may determine the provider of a venue (e.g. provider 321 in FIG. 3) in which the mobile device is located. If a broadcast SSID contains two provider names or if two SSIDs are broadcast, each containing one provider name, a recipient mobile device may then receive names for both a local provider and an associated regional provider with a business relationship to the local provider and may be able to discover a local location server for the venue using the method exemplified in FIG. 3.

If a SET provides both a WLAN MAC address and associated SSID(s) received from a WiFi AP to an H-SLP when querying for an SLP address (e.g. as in step S32 in FIG. 3), wherein each SSID may contain one or more provider names, the H-SLP may return to the SET (e.g. as in step S33 in FIG. 3) the address of another regional or global D-SLP associated with the provided SSID(s) when the H-SLP does not recognize the WLAN AP MAC address. The H-SLP may also indicate that the provided D-SLP is not the optimum D-SLP for location services to ensure the SET will send a second D-SLP query to the provided D-SLP. The SET may then query this D-SLP in order to discover another D-SLP more local to the SET (e.g. as in steps S34 and S35 in FIG. 3).

In an alternative implementation, a regional or global provider P1 could provide to its business partners a list L of the names (e.g. SSIDs) of local providers that it supports and their approximate geographic locations but without details of local provider D-SLPs or WiFi support. If a SET then queries its H-SLP for an authorized D-SLP for some local provider P2 and the H-SLP is able to determine that the regional or global provider P1 supports the local provider P2 (e.g. from information in the list L provided by P1 to the operator of the H-SLP), then the H-SLP may return the address of an authorized D-SLP belonging to provider P1 (e.g. as in step S33 in FIG. 3) together with an indication that this D-SLP may not be optimal. The SET may then query the returned D-SLP for the address of an authorized D-SLP belonging to the local provider P2 (e.g. as in steps S34 and S35 in FIG. 3). In this case, a SET need only obtain one local provider name (and not also a second associated provider name) in order to query its H-SLP initially (e.g. as in step S32 in FIG. 3).

In various alternative embodiments, SLP provider service areas may overlap if there is more than one local provider for the same area or if one or more regional or global providers support the same local areas well. In such embodiments with overlapping SLP provider service areas, a SET may not discover all providers for its current local area by listening to local WiFi and/or BT transmission. This may mean that a SET is not aware of a local service provider for its current location that may offer better service (e.g. less expensive, more extensive or higher quality service) than other local providers that a SET discovers from local WiFi and/or BT transmission. However, a SET that uses SUPL for D-SLP discovery and authorization may still be directed to the SLP provider preferred by its H-SLP to provide better (or optimum) service. Such optimization may be enabled if a SET provides all discovered local providers and related (e.g. regional or global) providers to its H-SLP when querying for a local D-SLP (e.g. in step S32 of FIG. 3). The H-SLP may then return to the SET (e.g. in step S33 in FIG. 3) preferred D-SLPs in priority order that are authorized for the SET. The SET may then access the returned D-SLPs in the priority order indicated by the H-SLP. If the SET determines that no returned D-SLP is optimum (e.g. after attempting to obtain service from each D-SLP) or if the H-SLP indicates that no returned D-SLP is optimum, the SET may query (in priority order) those returned D-SLPs that have proxy status to discover an optimum local D-SLP. This second query (or second set of queries) may provide to the SET a better D-SLP for a local provider not initially known to the SET.

In general in association with embodiments discussed above in association with FIG. 3, a provider (e.g. provider 321 or provider 331 in FIG. 3) may correspond to one or more of (i) the owner of a venue, (ii) the provider of local communications (e.g. WiFi and/or BT) infrastructure for a certain venue or other local area, (iii) a local provider of location and map services for a particular area or venue, or (iv) a regional or global provider with agreement to support location services in a certain local area.

As an alternative or supplement to using provider identifiers to discover a local D-SLP, as exemplified in FIG. 3 and the previous discussion of FIG. 3, a local D-SLP may be discovered, at least in part, using an area ID or area IDs. An area may indicate the immediate area or locale of a SET (e.g. a particular building, shopping mall, airport, city block). The identification of an area may be a designation such as "San Francisco Airport", "Scripps Hospital", "Company XYZ Building ABC" and thus may not be a complete civic address (such as a complete postal address) that is globally unique. Thus, an area identifier (ID), as well as a provider ID, may not be globally unique but may become unique when combined with an approximate geographic location since the geographic location may filter out all but one of the areas or providers with the same ID. One provider may support multiple areas—e.g. a company XYZ who acts as a provider may support location services in multiple buildings belonging to or leased by company XYZ each of which is assigned its own area ID (such as ABC, EFG, etc.). One area may instead support multiple providers—e.g. an area corresponding to San Diego international airport may have one or more local location providers and/or one or more regional or global providers. An area ID could be provided as part of a civic address by allocating certain fields used in a civic address (e.g. a field indicating a landmark or building) to represent an area. An area designation could represent (i) a particular building, (ii) a certain part (e.g. a floor) of a certain building, (iii) a particular set of buildings (e.g. a college campus, hospital complex, airport) or (iv) a portion of a town or city (e.g. a city block, a certain group of buildings, a certain geographic area) or (v) some other geographic or civic location or area. An area may refer to a continuous area or volume or may be geographically discontinuous (e.g. all buildings belonging to company XYZ in some city ABC). In the process exemplified in FIG. 3, a SET may provide a local area ID to an H-SLP (e.g. in step S32) or to a D-SLP (e.g. in step S34) in order to discover a local or regional D-SLP (e.g. D-SLP 330 or D-SLP 320 in FIG. 3). The area ID may be provided in addition to or instead of a local provider ID (e.g. provider ID 321 in FIG. 3). An H-SLP (e.g. H-SLP 312) or D-SLP (e.g. D-SLP 330) may then associate the provided area ID with the address of a suitable D-SLP (e.g. D-SLP 320 or D-SLP 330) that can provide location services within the geographic area associated with the provided area ID.

Figure 4:
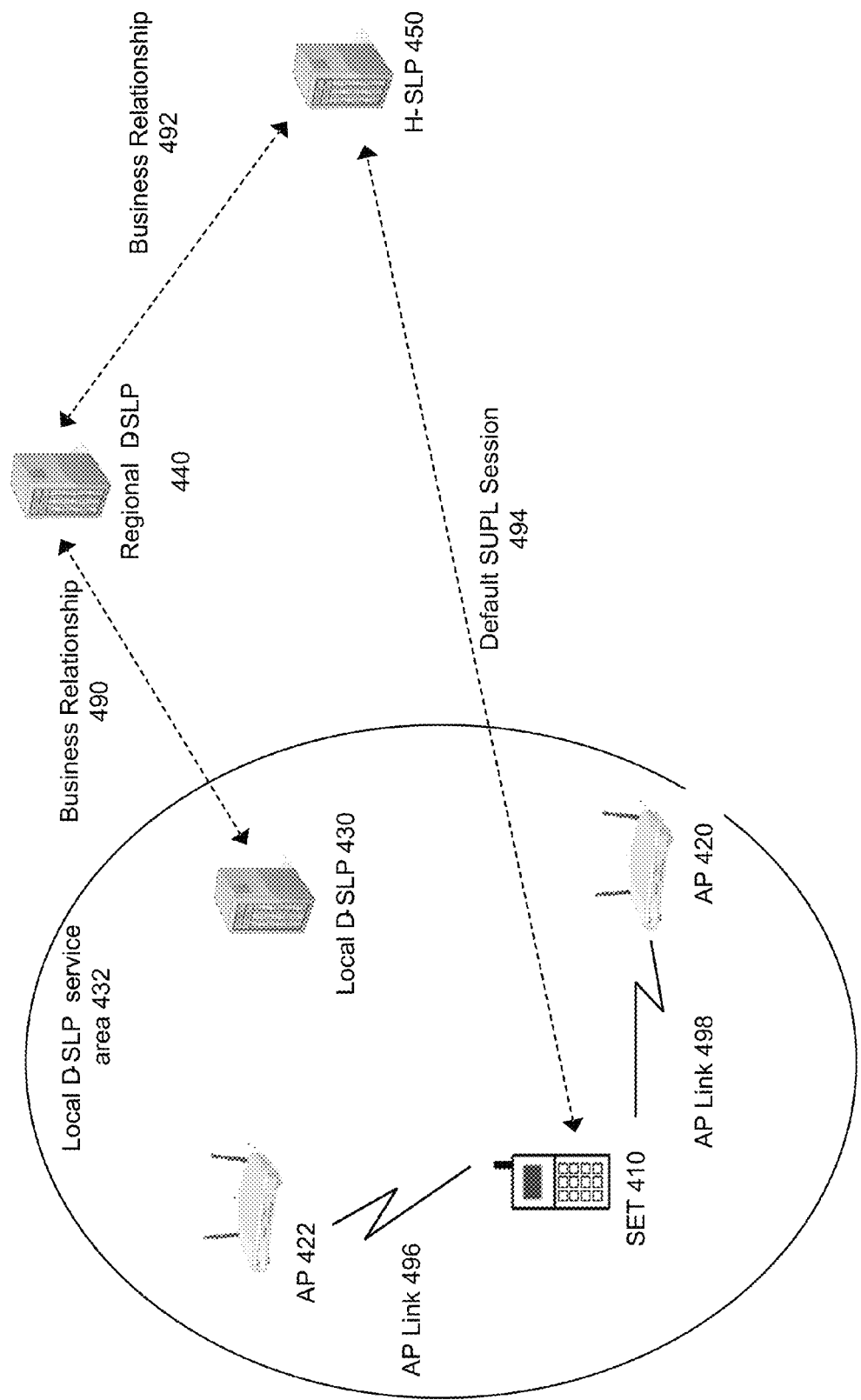
FIG. 4 is a system diagram illustrating a system for use with embodiments presented herein.

FIG. 4 shows an additional alternative embodiment according to the present innovations, including standard relationships between SET 410, the H-SLP 450 for SET 410, a regional D-SLP 440, and a local D-SLP 430 able to provide location services at the current location of SET 410. FIG. 4 further shows SET 410, AP 420, and AP 422 within a local D-SLP service area 432 associated with local D-SLP 430. SET 410 may need to discover local D-SLP 430 and/or have local D-SLP 430 authorized by H-SLP 450 or by an authorized regional D-SLP such as D-SLP 440. The default for location services provided to SET 410 may occur via default SUPL session 494 between SET 410 and H-SLP 450. The provider of regional D-SLP 440 may have a business relationship 492 with the provider of H-SLP 450. Similarly, the provider of local D-SLP 430 may have business relationship 490 with the provider of regional D-SLP 440. This may enable SET 410 to discover local D-SLP 430 and obtain location services as described further on herein in association with FIGS. 5, 6, 7 and 8.

Figure 5:
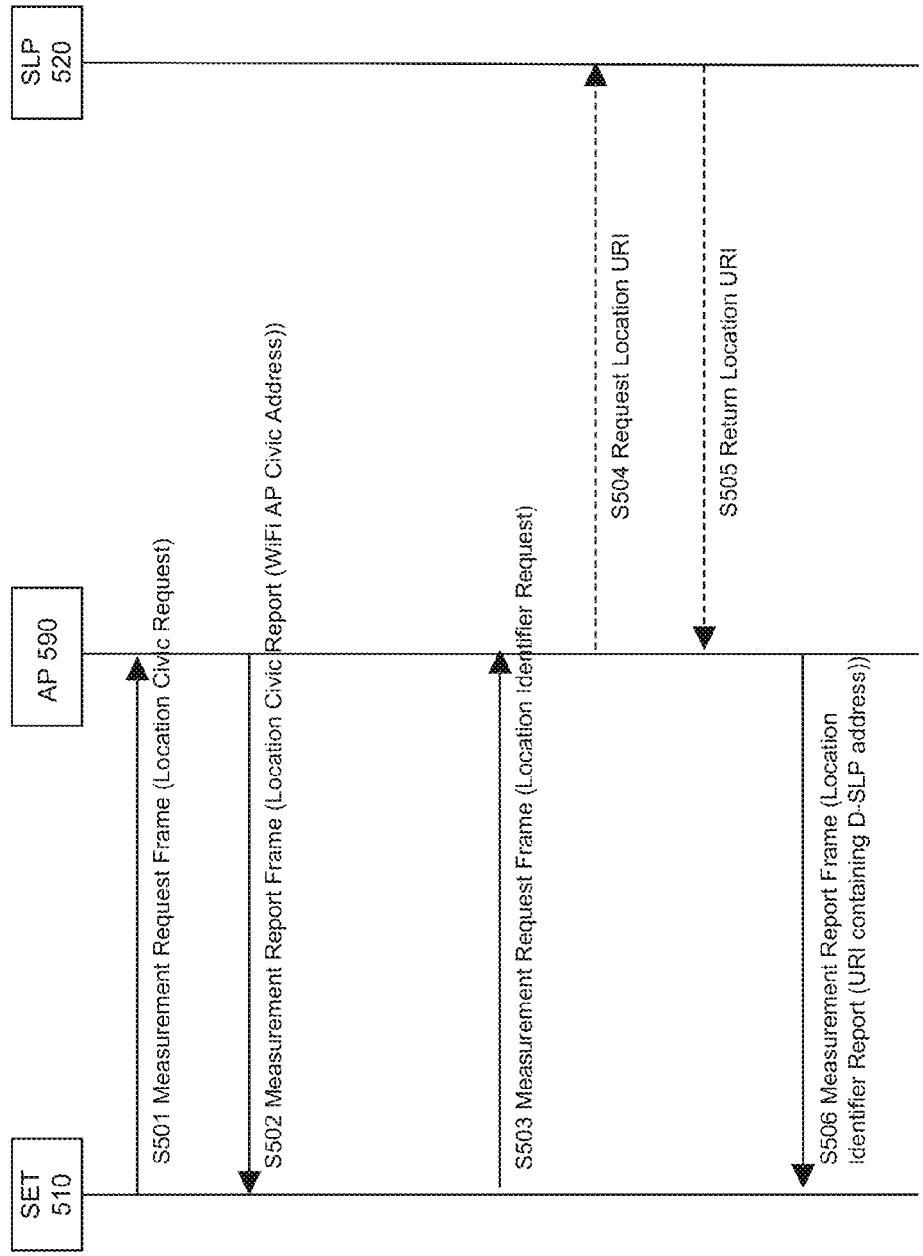
FIG. 5 is a flowchart illustrating a signal flow associated with a method according to one potential embodiment presented herein.
Figure 6:
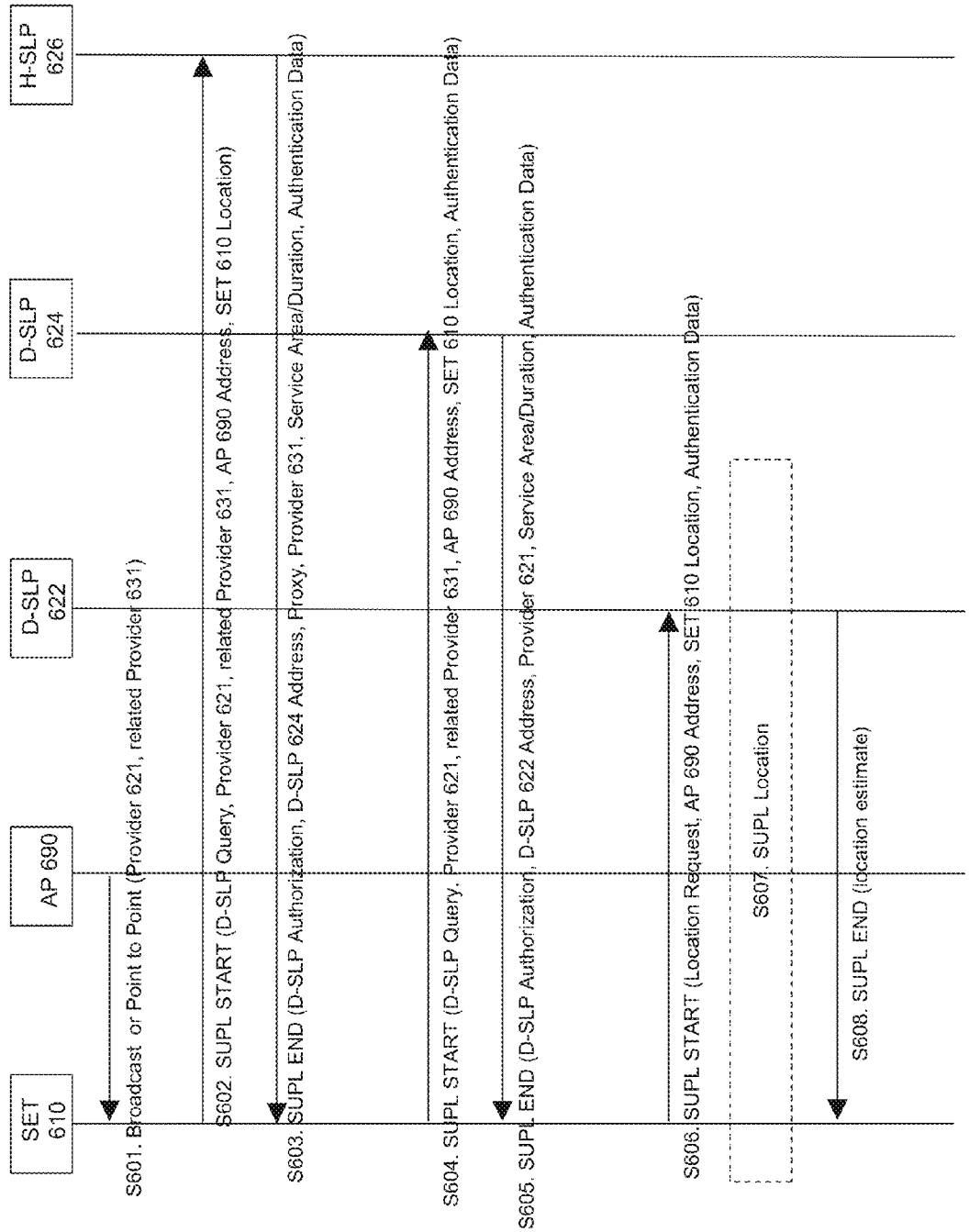
FIG. 6 is a flowchart illustrating a signal flow associated with a method according to one potential embodiment presented herein location services
Figure 7:
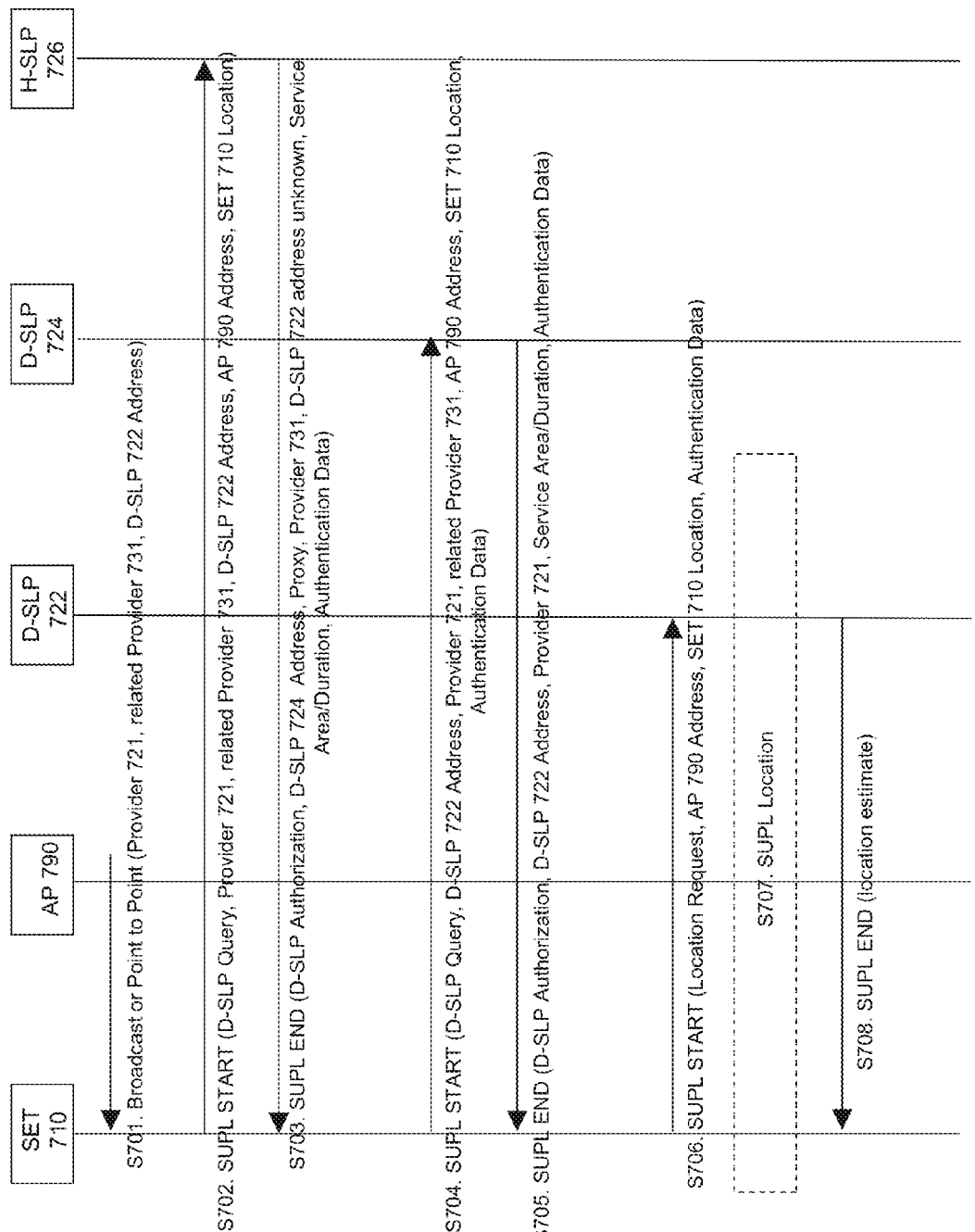
FIG. 7 is a flowchart illustrating a signal flow associated with a method according to one potential embodiment presented herein.
Figure 8:
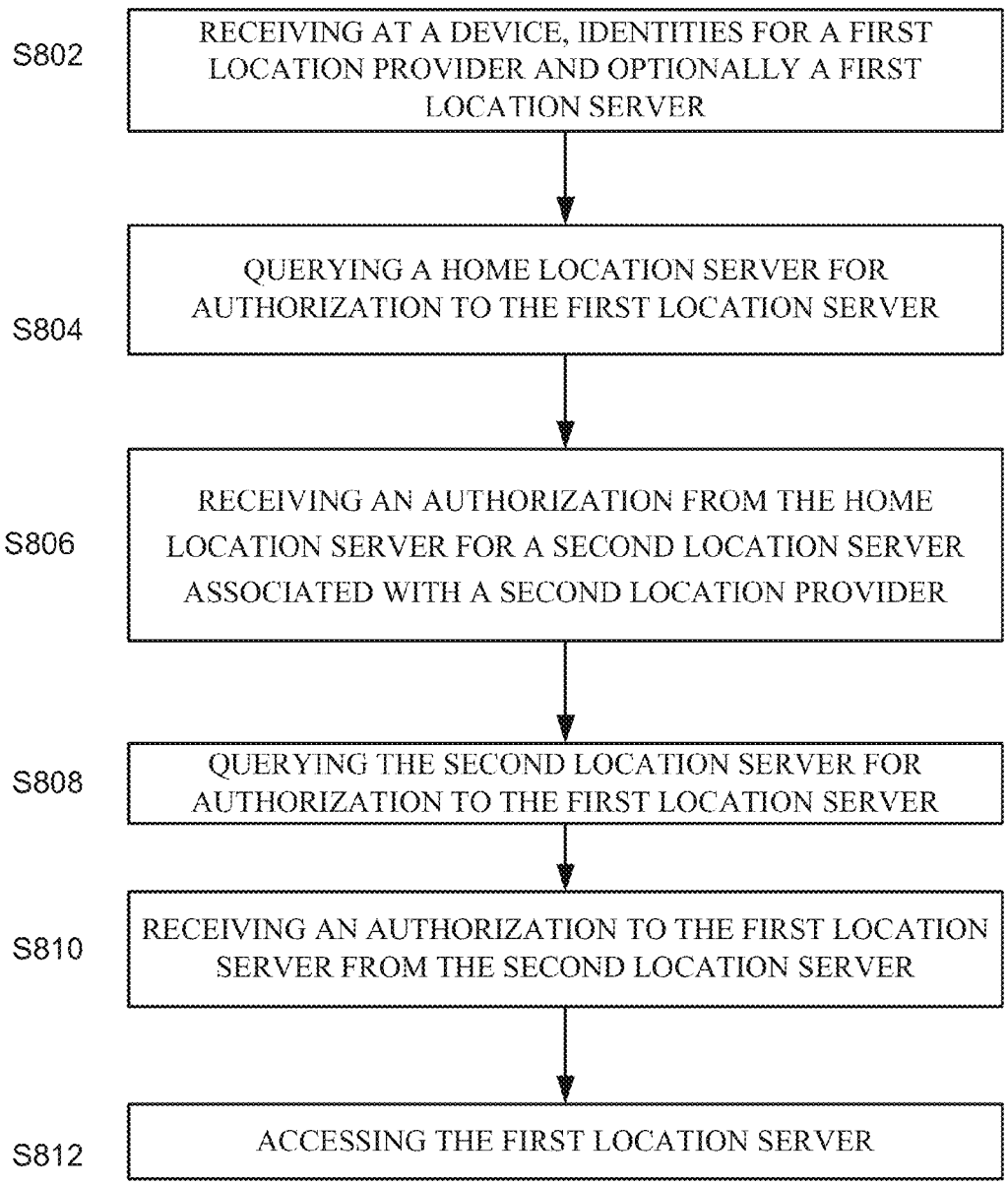
FIG. 8 is a flowchart illustrating a method according to one potential embodiment presented herein.

FIG. 5 illustrates a signal flow for an embodiment according to the present innovations wherein a SET may obtain a local D-SLP address. FIG. 6 illustrates an embodiment for two step discovery of a local D-SLP based on use of provider identities and using the SUPL location solution. FIG. 7 illustrates a two-step local D-SLP authorization based on use of provider identities and using the SUPL location solution. FIG. 8 illustrates a process flow for a two step discovery of a local D-SLP based on use of provider identities. While each of these figures illustrates aspects of one potential embodiment according to the present innovations, it will be understood that alternative signal flows will be possible using the architecture described above. While the elements in each figure are labeled distinctly, elements from different figures may correspond to one another as shown in Table 1.

TABLE 1

Possible Correspondence of Elements in FIG.S 3, 4, 5, 6 and 7

| Element | FIG. 3 | FIG. 4 | FIG. 5 | FIG. 6 | FIG. 7 |
|---|---|---|---|---|---|
| Mobile Device (SET) | 310 | 410 | 510 | 610 | 710 |
| WiFi AP(s) accessible by the SET | 390 | 420, 422 | 590 | 690 | 790 |
| Local D-SLP | 320 | 430 | 520 | 622 | 722 |
| Regional or Global D-SLP | 330 | 440 | | 624 | 724 |
| H-SLP for the SET | 312 | 450 | | 626 | 726 |

Corresponding elements in Table 1 are shown in like rows where the first entry of each row indicates the type of element. Thus, for example, row 4 shows corresponding elements for a local D-SLP with element 320 in FIG. 3 corresponding to element 430 in FIG. 4, element 520 in FIG. 5, element 622 in FIG. 6 and element 722 in FIG. 7. Where elements correspond to one another in two different figures, the process and interactions illustrated by both figures may be combined and may be supported by a single set of elements representing elements in either figure. With such a combination, the process and interactions for one figure may qualify, abbreviate, modify and/or extend the process and interactions for the other figure.

FIG. 5 includes SET 510, AP 590, and SLP 520. In the embodiment shown by FIG. 5, a SET 510 obtains information for a local location provider through interaction only with a local WiFi AP 590. At step S501, SET 510 may send a measurement request frame to a local WiFi AP 590 to request a civic location for WiFi AP 590. In step S502, WiFi AP 590 may return a measurement report frame containing a Location Civic Report that may include a civic location for WiFi AP 590. SET 510 may use the returned civic location to obtain a local provider identity and/or area identity for its current location if either or both identities are included as part of the WiFi civic location (e.g. are contained in one or more fields of the civic location as described earlier). If SET 510 obtains either identity, it may then query its H-SLP (e.g. H-SLP 450 in FIG. 4) and/or a regional D-SLP (e.g. D-SLP 440 in FIG. 4) for the address of a local D-SLP 520 using the procedure exemplified in FIG. 3 and exemplified further in FIGS. 6 and 7 described further on here.

At step S503 and independently of whether steps S501 and S502 are performed or not, SET 510 may send a measurement request frame with a location identifier request to the local WiFi AP 590 to request a location Universal Resource Identifier (URI) for SET 510. A location URI is typically assigned by a location server on behalf of a terminal and may contain an address for the location server, a protocol identifier for using the location URI and identification, typically meaningful only to the location server, for the terminal AP 590 may then, if authorized to do so, return such a location URI to SET 510 by returning a Measurement Report frame containing a Location Identifier Report that includes the location URI) in step S506 and may then skip steps S504 and S505. If AP 590 is not authorized to assign or return a location URI on behalf of AP 590, it may request a location URI from AP 590 at step S504 (and provide the identification of SET 510 as part of the request) and may receive back the location URI at step S505 before then transferring the location URI to SET 510 at step S506. SET 510 may then obtain the local D-SLP 520 address from the location URI and either use this address to access D-SLP 520 for location services or query its H-SLP (e.g. H-SLP 450 in FIG. 4) or a regional D-SLP (e.g. D-SLP 440 in FIG. 4) for authorization to access D-SLP 520.

FIG. 6 describes a two-step process for local D-SLP discovery and authorization. The process is similar to that in FIG. 3 (e.g. as shown by the corresponding elements in Table 1) but may apply more specifically to use of the SUPL location solution to perform the queries to the H-SLP and a regional D-SLP. FIG. 6 includes SET 610, AP 690, local D-SLP 622, regional D-SLP 624, and H-SLP 626. In step S601, SET 610 may discover the ID of a local provider 621 (not shown in FIG. 6) for its current location and the ID of a provider 631 (not shown in FIG. 6) related to provider 621—e.g. from information received from local WiFi AP 690 via broadcast or point to point. In order to discover a local location server for the local provider 621, at step S602, SET 610 may send a SUPL START message to its H-SLP 626 that indicates that this message is a query for a D-SLP and contains the local provider 621 ID, the related Provider 631 ID, the local AP 690 address and the SET 610 location or approximate location if known to SET 610. If H-SLP 626 needs a more accurate location for SET 610 in order to determine a suitable D-SLP, it may obtain the location of SET 610 via additional SUPL interaction not shown in FIG. 6. In this example, H-SLP 626 has little or no information for provider 621 (e.g. is not aware of D-SLP 622) but does have information for provider 631 including the address of regional D-SLP 624 belonging to provider 631. Accordingly, H-SLP 626 then sends at step S603 a SUPL END message to SET 610 that indicates authorization of a D-SLP and includes the address of regional D-SLP 624, an indication that this is a proxy D-SLP, an indication that this belongs to provider 631 and possibly a service area/duration limitation for D-SLP 624 and authentication data for D-SLP 624. Because, the SUPL END message in S603 indicates that D-SLP 624 belongs to provider 631 and not to local provider 621 and/or for other reasons (e.g. an indication in the SUPL END that D-SLP 624 is not optimum or that its service area does not include the current location of SET 610), SET 610 next queries D-SLP 624 for a local D-SLP. For this, SET 610 sends at step S604 a SUPL START message indicating a D-SLP query and containing the provider 621 ID, the related Provider 631 ID, the AP 690 address, the SET 610 location if known and any authentication data received from H-SLP 626 in step S603 to enable or assist D-SLP 624 to authenticate SET 610. In this example, because the provider 631 of D-SLP 624 has a business relationship with local provider 621, D-SLP 624 has information for provider 621 including the address of local D-SLP 622. D-SLP 624 may determine D-SLP 622 (and not some other local D-SLP) based on the provider 621 ID, the location of SET 610, the address of AP 690 received in step S604 and/or on other factors. D-SLP 624 may also instigate a SUPL interaction (not shown in FIG. 6) to obtain a more accurate location for SET 610 if needed to determine D-SLP 622. Then at step S605, D-SLP 624 returns a SUPL END message to SET 610 indicating a D-SLP authorization and containing the D-SLP 622 address, an indication that the provider of D-SLP 622 is 621 and possibly a service area/duration limitation for D-SLP 622 and authentication data. Because, the SUPL END message in S605 indicates that D-SLP 622 belongs to local provider 621 and/or for other reasons (e.g. an indication in the SUPL END that D-SLP 622 is optimum or that its service area includes the current location of SET 610), SET 610 may determine that the D-SLP 622 may be used to obtain location services at its current location. Consequently either immediately at some later time (e.g. when SET 610 needs assistance data or a location estimate), SET 610 at a step S606 sends a SUPL START message to D-SLP 622 indicating a location request and providing the AP 690 address, the SET 610 location or approximate location if known and any authentication data received from D-SLP 624 in step S605 to enable or assist D-SLP 622 to authenticate SET 610. SET 610 and D-SLP 622 may then exchange one or more SUPL messages in step S607 to transfer assistance data to SET 610 from D-SLP 622 and/or obtain a location estimate for SET 610 and/or perform other location services. At the conclusion of step S607, D-SLP 622 may send a SUPL END message to SET 610 at step S608 to terminate the SUPL session.

FIG. 7 describes a two-step process for local D-SLP authorization similar to the process in FIG. 6 with the difference that the SET is able to discover the address of a local D-SLP from a local WiFi AP and thence only needs to authorize the discovered address using a 2 step D-SLP query. In FIG. 6, on the other hand, the 2 step D-SLP query is used to both discover and authorize a local D-SLP address. The process in FIG. 7 is also similar to that in FIG. 3 (e.g. as shown by the corresponding elements in Table 1) but may apply more specifically to use of the SUPL location solution to perform the queries to the H-SLP and a regional D-SLP. FIG. 7 includes SET 710, AP 790, local D-SLP 722, regional D-SLP 724, and H-SLP 726. In step S701, SET 710 may discover the ID of a local provider 721 for its current location, the ID of a provider 731 related to provider 721 and the address of a local D-SLP 722—e.g. from information received from local WiFi AP 790 via broadcast and/or point to point. In order to have the local D-SLP 722 address received in step S701 authorized, SET 710 may, at step S702, send a SUPL START message to its H-SLP 726 that indicates that this message is a query for a D-SLP and contains the local provider 721 ID, the related Provider 731 ID, the D-SLP 722 address, the local AP 790 address and the SET 710 location or approximate location if known to SET 710. If H-SLP 726 needs a more accurate location for SET 710 in order to authorize D-SLP 722 (or D-SLP 724), it may obtain the location of SET 710 via additional SUPL interaction not shown in FIG. 7. In this example, H-SLP 726 has little or no information for provider 721 (e.g. is not aware of D-SLP 722 or provider 721) but does have information for provider 731 including the address of regional D-SLP 724 belonging to provider 731. Accordingly, H-SLP 726 then sends at step S703 a SUPL END message to SET 710 that indicates authorization of a D-SLP and includes the address of regional D-SLP 724, an indication that this is a proxy D-SLP, an indication that this belongs to provider 731, an indication that the requested D-SLP 722 address is unknown to (or cannot be authorized by) H-SLP 726 and possibly a service area/duration limitation for D-SLP 724 and authentication data for D-SLP 724. Because, the SUPL END message in S703 indicates that D-SLP 724 belongs to provider 731 and not to local provider 721 and/or because the SUPL END message indicates that D-SLP 722 is unknown to H-SLP 726 and/or for other reasons (e.g. an indication in the SUPL END that D-SLP 724 is not optimum or that its service area does not include the current location of SET 710), SET 710 next queries D-SLP 724 to authorize D-SLP 722. For this, SET 710 sends at step S704 a SUPL START message to D-SLP 724 indicating a D-SLP query and containing the provider 721 ID, the related Provider 731 ID, the D-SLP 722 address, the AP 790 address, the SET 710 location if known and any authentication data received from H-SLP 726 in step S703 to enable or assist D-SLP 724 to authenticate SET 710. In this example, because the provider 731 of D-SLP 724 has a business relationship with local provider 721, D-SLP 724 has information for provider 721 including the address of local D-SLP 722. D-SLP 724 may thus be able to authorize D-SLP 722 based on the D-SLP 722 address, provider 721 ID, the location of SET 710, the address of AP 790 received in step S704 and/or on other factors. D-SLP 724 may also instigate a SUPL interaction (not shown in FIG. 7) to obtain a more accurate location for SET 710 if needed to authorize D-SLP 722. Then at step S705, D-SLP 724 returns a SUPL END message to SET 710 indicating a D-SLP authorization and containing the D-SLP 722 address (indicated as authorized), an indication that the provider of D-SLP 722 is 721 and possibly a service area/duration limitation for D-SLP 722 and authentication data. Because, the SUPL END message in S705 indicates that D-SLP 722 is authorized and/or that D-SLP 722 belongs to local provider 721 and/or for other reasons (e.g. an indication in the SUPL END that D-SLP 722 is optimum or that its service area includes the current location of SET 710), SET 710 may determine that the D-SLP 722 may be used to obtain location services at its current location. Consequently either immediately or at some later time (e.g. when SET 710 needs assistance data or a location estimate), SET 710 at a step S706 sends a SUPL START message to D-SLP 722 indicating a location request and providing the AP 790 address, the SET 710 location or approximate location if known and any authentication data received from D-SLP 724 in step S705 to enable or assist D-SLP 722 to authenticate SET 710. SET 710 and D-SLP 722 may then exchange one or more SUPL messages in step S707 to transfer assistance data to SET 710 from D-SLP 722 and/or obtain a location estimate for SET 710 and/or provide other location services to SET 710. At the conclusion of step S707, D-SLP 722 may send a SUPL END message to SET 710 at step S708 to terminate the SUPL session.

FIG. 8 describes a simple method embodiment that may function using the systems described herein and describes a process that may align with the process examples in FIGS. 3, 6 and 7. In S802, a device receives identities for a first location provider and optionally for a first location server (e.g. a D-SLP). The device may be any computing device such as a smart phone, a laptop computer, or any other such computing device that may communicate with APs and location servers.

In S804, a home location server (e.g. an H-SLP) of the device is queried to authorize and, if not already obtained by the device, also provide an address of the first location server based on the identities for the first location provider and, if obtained at S802, the first location server. If the home location server is able to authorize and if needed provide an address of the first location server to the device, it will and the process may then terminate (not shown in FIG. 8). However, if the home location server is unable to authorize and if needed provide an address of the first location server to the device (e.g. due to not having any information for the first location provider), but the home location server does have information for a second location provider related to the first location provider, then in S806, the home location server will authorize to the device a second location server (e.g. a D-SLP) associated with the second location provider. Thus, the device receives an authorization for a second location server associated with the second location provider that is related to the first location provider.

In S808, the device queries the second location server for authorization to and, if needed, for the address of the first location server, and in S810, the device receives an authorization to, and if needed also an address of, the first location server from the second location server. In S812, the device may access the first location server to obtain location services such as assistance data or an estimated location.

While certain global, local, and regional SLPs are described above, additional specialized SLPs may be implemented to specialize in certain functions, such as an SLP specialized as a discovery or directory server (e.g. to authorize and provide addresses for local D-SLPs), specialized in AP control, or specialized in local UE location support. In various embodiments, structures may be implemented to identify SLP functions such as SLP discovery, Map data delivery, AD delivery, or other functions. In one embodiment, an H-SLP or proxy D-SLP may provide the authorized functions supported by each authorized D-SLP to the SET. In another alternative embodiment, the SUPL SLP capabilities parameter may be extended with supported SLP functions to enable SLP functions to be provided to a SET at the start of any SUPL session. Further, H-SLP functions may be enabled to be configured in a SET.

In certain embodiments, SUPL may be enhanced with additional commands and structures. For example, in a SUPL START message sent by a SET to an H-SLP or proxy D-SLP to request a new D-SLP address or authorization of a discovered D-SLP address, a provider name may be added for discovered or preferred providers for a D-SLP. Additionally, related provider names may be added to support multi-step SLP discovery. Further, an SSID parameter may be added obtained from a WLAN AP and a civic address for a location of or nearby to the SET may be added to convey a provider ID and/or area ID. Additionally, in a SUPL END message sent to authorize a D-SLP or provide an authorized D-SLP address, a provider name may be added to indicate the provider of an authorized D-SLP, which may be used by a SET to help determine priority if provider priorities are configured in or provided to the SET by an H-SLP. An indication of a local area served by an authorized D-SLP may also be added to a SUPL END message and a civic address may be added to convey a provider ID and/or area ID. An extended D-SLP services parameter may be added to a SUPL END message to indicate additional functions authorized for a D-SLP. An indication that "a D-SLP address requested to be authorized by a SET is unknown" may also be added to such a SUPL END message. Such an indication may enable the SET to query another SLP such as a proxy D-SLP to authorize the D-SLP address. Further embodiments may include an indication of whether an authorized D-SLP address is optimum for the SET location (e.g. is a local SLP) or not optimum (e.g. is a regional or global SLP).

Certain embodiments may be integrated with the IEEE 802.11 protocol such as the 802.11v set of enhancements. In such embodiments, a UE may request the civic address of a WiFi AP using the 802.11v Location Request and Report messages. A civic address may be requested in IETF RFC 4776 format allowing inclusion of country, city, street address, building name, floor, room number. Alternative embodiments may be used to discover the local provider and area IDs when such IDs are included as part of a civic address.

To assist in obtaining a local D-SLP address, a SET may request a location reference from a WiFi AP using the 802.11v Location Identifier Request and Report messages. In such embodiments, a location reference may be a URI containing a location server address, a protocol indication and a reference to the SET. The SET may then treat the location server address portion of a location reference as a potential local SLP address and the address may indicate that the server supports SUPL and/or could contain the provider name.

Additional embodiments implemented with 802.11 may include added broadcast or request of WiFi AN provider names and any related providers, broadcast of civic addresses, broadcast of local D-SLP addresses, and/or provision of local D-SLP authentication data for SUPL authentication of a SET by a local D-SLP. Additional such implementations may broadcast location AD, for example, carried using LPP/LPPe or LPPe within 802.11 frames.

Further embodiments may include interworking elements in conjunction with 802.11u. Such embodiments may be included in 802.11 beacon and probe response frames. These may include venue related information such as a venue group (e.g., Assembly, Business, Outdoor, etc.) and/or a venue type (e.g., Arena, Stadium, Museum, Airport, etc.). An Advertisement Protocol Element may be included in Beacon and Probe Response frames. This may contain supported Advertisement Protocol ID(s) together with Advertisement Control information (e.g., length of Query Response message). Advertisement protocols may be included such as an Access Network Query Protocol (e.g. an 802.11 native advertisement protocol) and/or a vendor specific protocol wherein a header may contain an Organizationally Unique Identifier of the entity that has defined the content. Such information may be used to convey information on location providers, area IDs and location servers.

Figure 9:
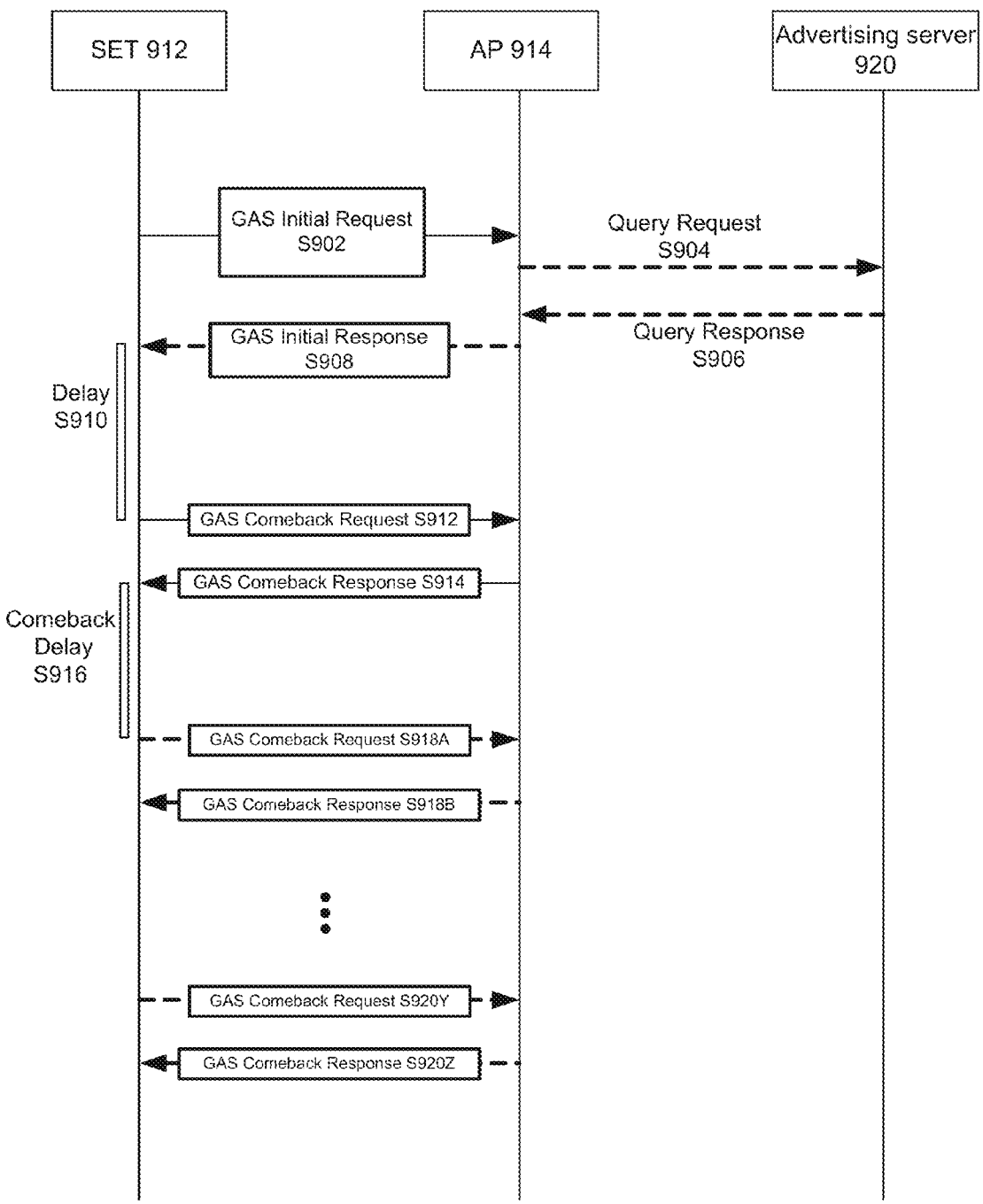
FIG. 9 is a flowchart illustrating a signal flow associated with a method according to one potential embodiment presented herein.

FIG. 9 illustrates one potential implementation of an information flow implemented in conjunction with an advertising service that may be provided with WiFi AP access according to various embodiments. In certain embodiments, IEEE 802.11u may function to implement such advertising in conjunction with a system that enables discovery and/or authorization of a local location server as described above. Such a generic advertisement service (GAS) may provide for Layer 2 transport of an advertisement protocol's frames between a mobile device and an AP prior to authentication of the mobile device. In such an embodiment, GAS Request/Response frames may include container data, which is formatted according to a particular advertisement protocol. GAS messages may then be transmitted using Public Action management frames. A SET may initiate service or provider discovery by sending a GAS Initial Request frame to a local AP. The GAS Query Response from the AP may be delivered to the SET in a single GAS Initial Response frame, or in one or more GAS Comeback Response frames. If the GAS Query Response is too large to fit into one frame, GAS fragmentation may be used. The GAS response messages from the AP may provide a SET with information related to one or more local providers, one or more local areas, one or more local D-SLPs (e.g. may provide the address or identities of these elements). This information may then be used as described previously to enable a SET to obtain the address of a local location server such as a local D-SLP.

As shown in FIG. 9, SET 912 may receive information (e.g. in GAS response frames) from advertising server 920 via AP 914. Advertising server 920 may be a local or regional D-SLP or an LBS Application (e.g. LBS Application 160 in FIG. 1) in some embodiments. In S902, an initial request from SET 912 may be communicated as a GAS initial request to AP 914. AP 914 may then initiate a query request to advertising server 920 at S904 to obtain advertising related information (e.g. including local provider and local D-SLP information) if AP 914 is not already provisioned with this information. When a response is received in S906, along with advertising information, a GAS initial response may then be communicated to SET 912 at S908, along with advertising information that may include provider, area and/or local D-SLP information. If complete information is not provided in the initial GAS Response at S908, SET 912 may request additional information after suitable delays S910, S916 etc. by sending additional GAS Comeback Request frames in steps S912, S918A, S920Y (and at other times not shown in FIG. 9) which may cause AP 914 to respond with additional information in GAS Comeback response frames at steps S914, S918B and S920Z (and possibly at other steps not shown in FIG. 9).

Still further embodiments implemented with 802.11u may include an access network query protocol (ANQP), which may be a native advertisement protocol included in GAS request/response frames (e.g. sent as exemplified in FIG. 9). Response messages in ANQP may include venue information which may include one or more venue names. Response messages may further include (i) an emergency call number or a list of Emergency Call Numbers, (ii) an AP location in civic or geographic format, (iii) an AP location URI that provides a reference to where the location information for the AP can be retrieved, (iv) a list of one or more domain names of the entity operating the 802.11 access network, and/or (v) vendor specific elements such as a D-SLP Address or any other vendor preferred information.

Thus, in various alternative embodiments, enhancements to SUPL, 802.11 and/or LPPe may be included for improved support of D-SLP discovery and authorization.

Figure 10:
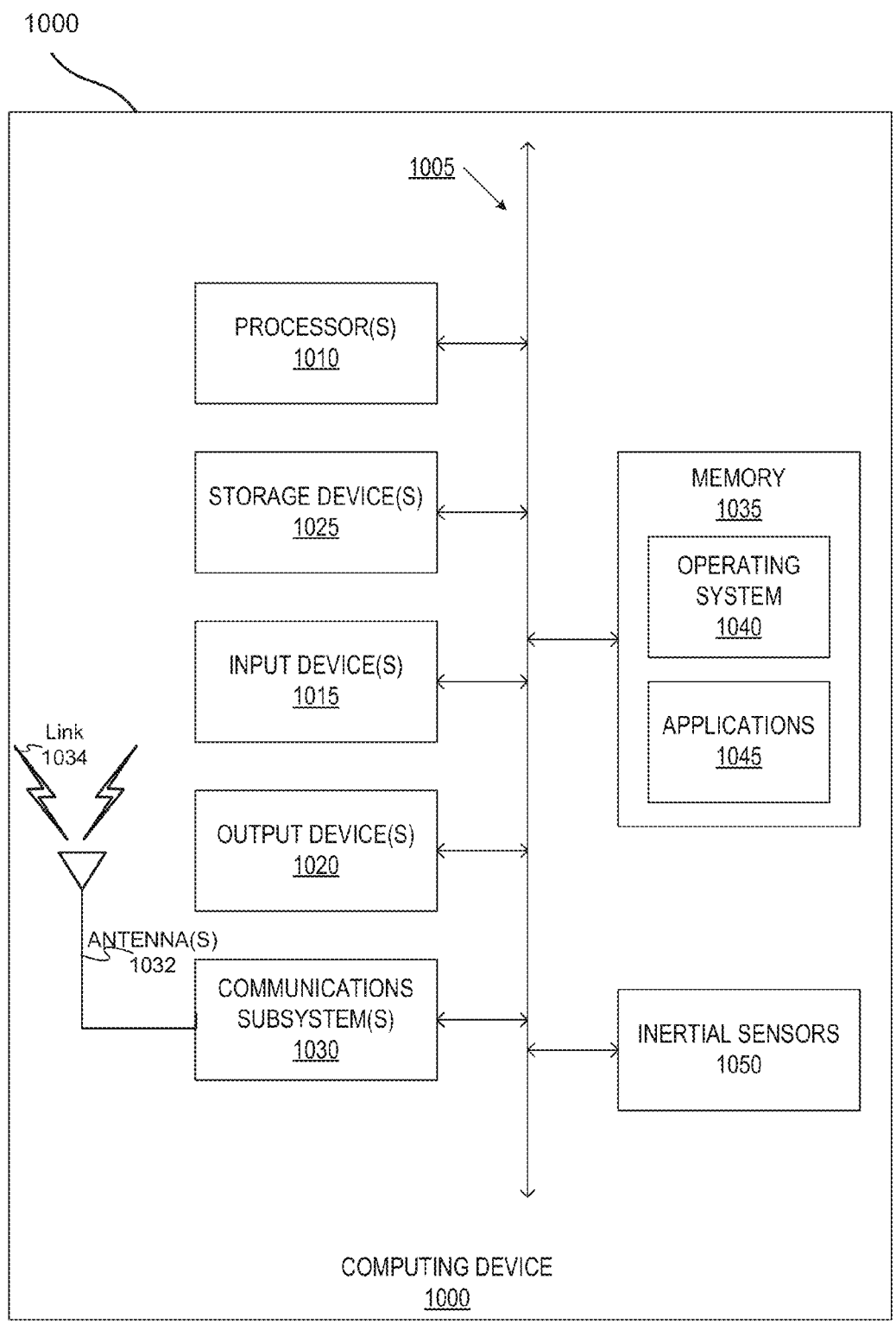
FIG. 10 is one potential implementation of a computer device according to certain embodiments.

An example of a computing system in which various aspects of the disclosure may be implemented may now be described with respect to FIG. 10. According to one or more aspects, a computer system as illustrated in FIG. 10 may be incorporated as part of a computing device, which may implement, perform, and/or execute any and/or all of the features, methods, and/or method steps described herein. For example, computer system 1000 may represent some of the components of a UE, SET, Mobile Device, location server, SLP, D-SLP, H-SLP, AP, WiFi AP, LBS Application or database devices as described herein in FIGS. 1 through 9. A mobile device may be any computing device with a wireless unit, such as an RF receiver. Examples of a mobile device include but are not limited to cellphones, smartphones, GPS devices, tablets, laptops, survey equipment, and related computer systems and software. In one embodiment, the system 1000 is configured to implement any of the methods described herein. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, a set-top box, and/or a computer system. FIG. 10 is meant only to provide a generalized illustration of various components, any and/or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a camera, a mouse, a keyboard and/or the like; and one or more output devices 1020, which can include without limitation a display unit, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 may also include a communications subsystem 1030, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 may further comprise a non-transitory working memory 1035, which can include a RAM or ROM device, as described above.

The computer system 1000 also may comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configuration systems, provided by other embodiments, as described herein. Merely by way of example, one or more procedures described with respect to the method(s) discussed above, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. Any device described herein, such as location server 130, AP 390, SET 410, or any other device, server or otherwise described system may include such elements as a processor, display, communication subsystem, memory, or any other such element as shown in FIG. 10.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). For example, location server 130 and mobile device 110, along with any other device described herein, may include a machine readable medium. In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Some embodiments may employ a computer system (such as the processor 1010) to perform methods in accordance with the disclosure. For example, some or all of the procedures of the described methods may be performed by the viewing apparatus in response to the processor executing one or more sequences of one or more instructions (which might be incorporated into an operating system and/or other code, such as an application program) contained in working memory. Such instructions may be read into the working memory from another computer-readable medium, such as one or more of the storage device(s). Merely by way of example, execution of the sequences of instructions contained in the working memory might cause the processor(s) to perform one or more procedures of the methods described herein.

Again, embodiments employing computer systems described herein are not limited to being physically connected to the viewing apparatus. Processing may occur in another apparatus, connected via wire or wirelessly to the viewing apparatus. For example, a processor in a phone or instructions for executing commands by a phone or tablet may be included in these descriptions. Similarly, a network in a remote location may house a processor and send data to the viewing apparatus.

The terms "machine-readable medium" and "computer-readable medium," as used herein, refer to any medium that participates in providing data that causes a machine to operate in a specific fashion. In an embodiment implemented using the processor 1010, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory, such as flash memory or DDR3 RAM. Transmission media include, without limitation, coaxial cables, copper wire and fiber optics, as well as the various components of a communications subsystem (and/or the media by which the communications subsystem provides communication with other devices). Hence, transmission media can also take the form of waves (including without limitation radio, acoustic and/or light waves, such as those generated during radio-wave and infrared data communications).

Computer system 1000 when used to implement a mobile device, UE or SET may contain inertial sensors 1050 to assist location of computer system 1000 and/or may contain an antenna 1032 or additional antennas and hardware (e.g. processors, memory, communications support) dedicated or enabled to support reception of navigation satellite signals from one or more Global Navigation Satellite Systems to enable location of computer system 1000. Computer system 1000 may further include an antenna or antennas and hardware (e.g. processors, memory, transceivers not shown in FIG. 10) dedicated or enabled to support reception and transmission of radio signals related to cellular, WiFi, BT or other radio communications supported by computer system 1000. Such hardware may be part of communications subsystem 1030, or may be additional elements of computing device comprising additional processors 1010, storage devices 1025, input devices 1015, and/or output devices 1020 which may further use a portion of memory 1035 or a separate dedicated memory (not shown in FIG. 10.)

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. It will be understood by a person of ordinary skill in the art that the above examples are illustrative, and that alternative embodiments are possible using various combinations and alternatives to the embodiments described herein without departing from the scope of the invention. These and other alternatives may therefore operate are within the scope of the following claims.

Figure 11:
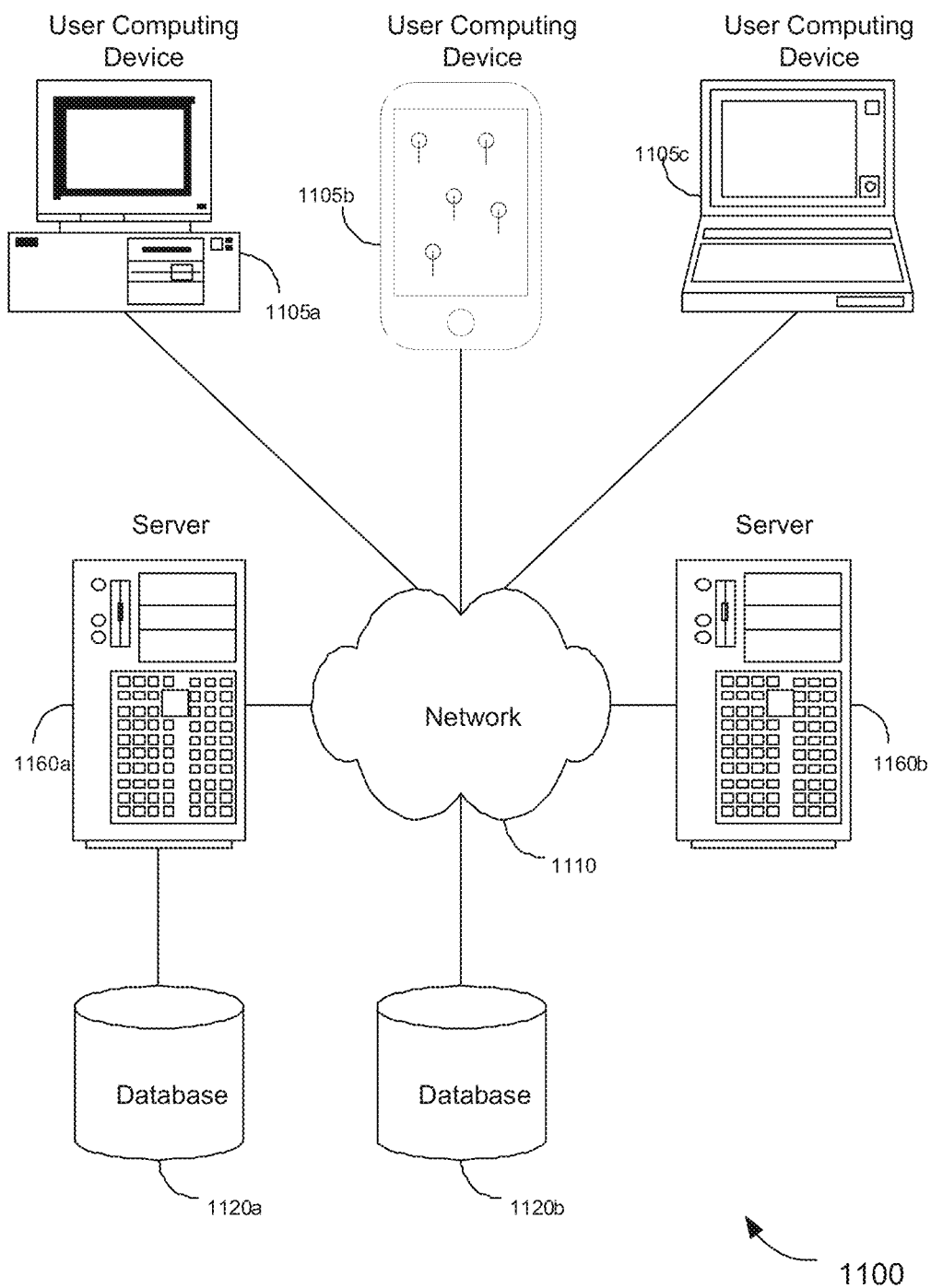
FIG. 11 is one potential implementation of a networked computer system according to certain embodiments.

In various embodiments as described herein, computing devices may be networked in order to send and receive signals both to implement location measurements and also to communicate general information between computing devices. For example the links shown in FIGS. 1-4 as arrows may be wireless communication links both for communicating information and for authorizing various hierarchies of SLP servers. FIG. 11 illustrates a schematic diagram of a system 1100 of networked computing devices that can be used in accordance with one set of embodiments. The system 1100 can include one or more user computing devices 1105. The user computing devices 1105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computing devices 1105 can also have any of a variety of applications, including one or more applications configured to perform methods of the invention, as well as one or more office applications, database client and/or server applications, and web browser applications. Alternatively, the user computing devices 1105 can be any other electronic device, such as a thin-client computer, Internet-enabled mobile telephone, and/or personal digital assistant (PDA), capable of communicating via a network (e.g., the network 1110 described below) and/or displaying and navigating web pages or other types of electronic documents. Although the exemplary system 1100 is shown with three user computing devices 1105, any number of user computing devices can be supported. The user computing devices 1105 may represent any of the mobile device elements (e.g. a UE or SET) shown and described herein with reference to FIGS. 1 through 9.

Certain embodiments of the invention operate in a networked environment, which can include a network 1110. The network 1110 can be any type of network familiar to those skilled in the art that can support data communications using any of a variety of commercially-available protocols, including, without limitation, TCP/IP, SNA, IPX, AppleTalk, and the like. Merely by way of example, the network 1110 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infra-red network; a wireless network, including, without limitation, a network operating under any of the IEEE 802.11 WiFi suite of protocols, the Bluetooth™ protocol known in the art, and/or any other wireless protocol such as GSM, WCDMA, CDMA, HRPD and LTE; and/or any combination of these and/or other networks. Network 1110 may enable communication and interaction between certain pairs of elements shown and described with reference to FIGS. 1 through 9 herein—for example, may enable communication and interaction on one or more of the S1, S2, S3, S4, S5, S6, S7, S8 and S9 interfaces in FIG. 1 and/or may support the interaction for one or more of steps S31, S32, S33, S34, S35 and S36 in FIG. 3. Network 1110 may include one or more APs and networks shown and described with reference to FIGS. 1 through 9 herein—e.g., access network 120 in FIG. 1 and/or AP 390 in FIG. 3.

Embodiments of the invention can include one or more server computers 1160. Each of the server computers 1160 may be configured with an operating system, including, without limitation, any of those discussed above, as well as any commercially (or freely) available server operating systems. Each of the servers 1160 may also be running one or more applications, which can be configured to provide services to one or more user computing devices 1105 and/or other servers 1160.

Merely by way of example, one of the servers 1160 may be a web server, which can be used, merely by way of example, to process requests for web pages or other electronic documents from user computing devices 1105 in addition to the wireless location measurement usage described throughout. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computing devices 1105 to perform methods of the invention.

The server computers 1160, in some embodiments, might include one or more application servers, which can include one or more applications accessible by a client running on one or more of the client computers 1105 and/or other servers 1160. Merely by way of example, the server(s) 1160 can be one or more general purpose computers capable of executing programs or scripts in response to the user computing devices 1105 and/or other servers 1160, including, without limitation, web applications (which might, in some cases, be configured to perform methods of the invention). Merely by way of example, a web application can be implemented as one or more scripts or programs written in any suitable programming language, such as Java™, C, C# or C++, and/or any scripting language, such as Perl, Python, or TCL, as well as combinations of any programming/scripting languages. The application server(s) can also include database servers, including without limitation those commercially available from Oracle™, Microsoft™, Sybase™ IBM™, and the like, which can process requests from clients (including, depending on the configurator, database clients, API clients, web browsers, etc.) running on a user computing device 1105 and/or another server 1160. In some embodiments, an application server can create web pages dynamically for displaying the information in accordance with embodiments of the invention, such as information communicated from an SLP to a web page for viewing by an authorized third party tracking request. Data provided by an application server may be formatted as web pages (comprising HTML, Javascript, etc., for example) and/or may be forwarded to a user computing device 1105 via a web server (as described above, for example). Similarly, a web server might receive web page requests and/or input data from a user computing device 1105 and/or forward the web page requests and/or input data to an application server. In some cases a web server may be integrated with an application server.

In accordance with further embodiments, one or more servers 1160 can function as a file server and/or can include one or more of the files (e.g., application code, data files, etc.) necessary to implement methods of the invention incorporated by an application running on a user computing device 1105 and/or another server 1160. Alternatively, as those skilled in the art will appreciate, a file server can include all necessary files, allowing such an application to be invoked remotely by a user computing device 1105 and/or server 1160. It should be noted that the functions described with respect to various servers herein (e.g., application server, database server, web server, file server, etc.) can be performed by a single server and/or a plurality of specialized servers, depending on implementation-specific needs and parameters. Servers 1160 may represent one or more servers shown in FIGS. 1 through 9 including a location server (e.g. location server 130 in FIG. 1), an SLP (e.g. SLP 230 in FIG. 2 and/or D-SLPs 320 and 330 in FIG. 3), and an LBS Application (e.g. LBS Application 160 in FIG. 1).

In certain embodiments, the system can include one or more databases 1120. The location of the database(s) 1120 is discretionary: merely by way of example, a database 1120a might reside on a storage medium local to (and/or resident in) a server 1160a (and/or a user computing device 1105). Alternatively, a database 1120b can be remote from any or all of the computers 1105 or servers 1160, so long as the database 1120b can be in communication (e.g., via the network 1110) with one or more of these. In a particular set of embodiments, a database 1120 can reside in a storage-area network ("SAN") familiar to those skilled in the art. (Likewise, any necessary files for performing the functions attributed to the computers 1105 or servers 1160 can be stored locally on the respective computer and/or remotely, as appropriate.) In one set of embodiments, the database 1120 can be a relational database, such as an Oracle™ database, that is adapted to store, update, and retrieve data in response to SQL-formatted commands. The database might be controlled and/or maintained by a database server, as described above, for example. Such databases may store information related to AP location and identification, securing information, or other such information that may enable various embodiments of network location according to the embodiments described herein. Databases 1120 may represent one or more databases shown and described in relation to FIGS. 1 through 9 herein—e.g. map and access network database 150 in FIG. 1.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application various embodiments. Also, a number of steps may be undertaken before, during, or after the above elements are considered.

What is claimed is:

1. A method of supporting location services at a mobile device comprising:
    receiving at the mobile device an identity of a first location provider;
    querying a home location server for authorization to a first location server associated with the first location provider, the first location server providing location services to a first service area comprising a venue or building;
    receiving an authorization from the home location server for access to a second location server associated with a second location provider, the second location server providing location services to a second service area larger than the first service area;
    querying the second location server for authorization to the first location server;
    receiving an authorization to access the first location server from the second location server; and
    accessing the first location server to receive location services.

2. The method of claim 1 wherein the home location server is an a Home-SLP (H-SLP), where "SLP" is a SUPL Location Platform, and "SUPL" is a Secure User Plane Location.

3. The method of claim 1 wherein the second location server is a Discovered (D-SLP).

4. The method of claim 1 wherein the first location server is a D-SLP.

5. The method of claim 1 wherein the first and second location providers have a business relationship.

6. The method of claim 1 wherein the identity of the first location provider comprises an identity of an area supported by the first location provider.

7. The method of claim 1 further comprising:
    receiving at the mobile device the identity of the first location server wherein the querying of the home location server and the querying of the second location server include providing the identity of the first location server.

8. The method of claim 1 further comprising:
    receiving at the mobile device the identity of the second location provider wherein the querying of the home location server and the querying of the second location server include providing the identity of the second location provider.

9. The method of claim 1 wherein receiving at the device, identities for the first location server and the associated location provider comprises receiving a business name from an access point (AP) controlled by the first location server; wherein the first location server is a first discovered SLP server (D-SLP) and wherein the second location server is a second D-SLP.

10. The method of claim 9 wherein querying the H-SLP for authorization to the first location server comprises:
    initiating a first SUPL session with the H-SLP; and
    communicating the business name and a media access control (MAC) address of the AP to the H-SLP.

11. The method of claim 10 wherein receiving the authorization from the H-SLP for the second location server associated with the associated location provider comprises receiving an IP address and first authentication data for the second location server; and
    ending the first SUPL session with the H-SLP.

12. The method of claim 11 wherein querying the second location server for authorization to the first location server comprises:
    initiating a second SUPL session with the second D-SLP; and
    communicating the first authentication data to the second D-SLP as part of the second SUPL session.

13. The method of claim 12 wherein receiving the authorization to the first location server from the second location server comprises:
    receiving second authentication data from the second D-SLP as part of the second SUPL session; and
    ending the second SUPL session.

14. The method of claim 13 wherein accessing the first location server comprises:
communicating the second authentication data to the AP associated with the first D-SLP; and
receiving approval from the first D-SLP to access a wide area network Internet connection via the AP using the device.

15. The method of claim 13 wherein accessing the first location server comprises:
initiating a third SUPL session with the first D-SLP using the second authentication data; and
requesting assistance data (AD) from the first D-SLP.

16. The method of claim 15 further comprising:
receiving map data from the first D-SLP.

17. The method of claim 15 further comprising:
performing a position measurement of the device using the first D-SLP and the AP.

18. The method of claim 15 wherein the request for AD further comprises a generic advertising service (GAS) initial request.

19. The method of claim 18 further comprising:
receiving, from an advertising server via the first D-SLP, advertising information as part of a GAS response;
receiving an approval for display of the advertising information at the device;
and receiving AD at the device in response to the approval for display of the advertising information at the device.

20. The method of claim 1 wherein the identities for the first location server and the associated location provider are received as part of a broadcast message from an access point.

21. The method of claim 1 further comprising:
receiving from the first location server, a time limit for the first location server to provide assistance data.

22. A device comprising:
means for receiving at the mobile device an identity of a first location provider;
means for querying a home location server for authorization to a first location server associated with the first location provider, the first location server providing location services to a first service area comprising a venue or building;
means for receiving an authorization from the home location server for access to a second location server associated with a second location provider, the second location server providing location services to a second service area larger than the first service area;
means for querying the second location server for authorization to the first location server;
means for receiving an authorization to access the first location server from the second location server; and
means for accessing the first location server to receive location services.

23. The device of claim 22 further comprising:
means for operating a location based services (LBS) application.

24. The device of claim 22 further comprising:
means for communicating with the first location server via the LBS application.

25. A non-transitory computer readable instruction medium comprising instructions that, when executed by a processor of a mobile device, cause the mobile device to perform a method comprising:
receiving at the mobile device an identity of a first location provider;
querying a home location server for authorization to a first location server associated with the first location provider, the first location server providing location services to a first service area comprising a venue or building;
receiving an authorization from the home location server for access to a second location server associated with a second location provider, the second location server providing location services to a second service area larger than the first service area;
querying the second location server for authorization to the first location server;
receiving an authorization to access the first location server from the second location server; and
accessing the first location server to receive location services.

26. The non-transitory computer readable instruction medium of claim 25 wherein the method further comprises receiving map data from the first location server and performing a position measurement of the device using the first location server and an access point associated with the first location server.

27. The non-transitory computer readable instruction medium of claim 25 wherein the method further comprises:
communicating a generic advertising service (GAS) initial request to the first location server with a request for assistance data (AD);
receiving, from an advertising server via the first location server, advertising information as part of a GAS response;
receiving an approval for display of the advertising information at the device;
and receiving AD at the device in response to the approval for display of the advertising information at the device.

28. A mobile device comprising:
a memory; and
a processor coupled to the memory, wherein the processor is configured to:
receive at the mobile device an identity of a first location provider;
query a home location server for authorization to a first location server associated with the first location provider, the first location server providing location services to a first service area comprising a venue or building;
receive an authorization from the home location server for access to a second location server associated with a second location provider, the second location server providing location services to a second service area larger than the first service area;
query the second location server for authorization to the first location server;
receive an authorization to access the first location server from the second location server; and
access the first location server to receive location services.

29. The device of claim 28 wherein the processor is further configured to execute a location based services (LBS) application and communicate with the first D-SLP via the LBS application.

* * * * *